US006295087B1

United States Patent
Nohda

(10) Patent No.: US 6,295,087 B1
(45) Date of Patent: Sep. 25, 2001

(54) IMAGE PICKUP APPARATUS HAVING AN INTERPOLATION FUNCTION

(75) Inventor: Shigetoshi Nohda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/969,266

(22) Filed: Nov. 13, 1997

(30) Foreign Application Priority Data

Nov. 18, 1996 (JP) .................................................. 8-306788

(51) Int. Cl.[7] .................................................... H04N 9/68
(52) U.S. Cl. ............................................ 348/234; 348/273
(58) Field of Search ................................. 348/207, 220, 348/221, 222, 223, 224, 228, 229, 230, 231, 234, 235, 238, 239, 272, 273, 280, 281, 282, 283, 237, 246, 247; 358/400; H04N 9/68, 5/335

(56) References Cited

U.S. PATENT DOCUMENTS

| 5,113,247 | | 5/1992 | Akiyama et al. . | |
|---|---|---|---|---|
| 5,233,411 | * | 8/1993 | Nam et al. ............................. | 348/231 |
| 5,262,849 | * | 11/1993 | Mimura et al. ....................... | 348/224 |
| 5,289,269 | | 2/1994 | Sugimori et al. . | |
| 5,402,173 | | 3/1995 | Noguchi et al. . | |
| 5,521,636 | * | 5/1996 | Nakayama et al. ................... | 348/222 |
| 5,552,827 | | 9/1996 | Maenaka et al. . | |
| 6,018,363 | * | 1/2000 | Horii ..................................... | 348/219 |

FOREIGN PATENT DOCUMENTS 05 122612   5/1993   (JP) .
07-236150   9/1995   (JP) .

* cited by examiner

*Primary Examiner*—Tuan Ho
(74) *Attorney, Agent, or Firm*—Frommer Lawrence & Haug LLP; William S. Frommer; Dexter T. Chang

(57) ABSTRACT

The present invention enables to obtain an image of a high resolution as reasonable costs by using an adaptive interpolation circuit which is supplied by image data R, G, and B which have been subjected to a white balance adjustment in a DSP and an R-G image is combined in an internal memory. The adaptive interpolation circuit calculates correlation degrees in a vertical direction, a horizontal direction, and diagonal directions. If an interpolation is executed according to the R-G image in the direction having the greatest correlation degree, no LPF processing is executed, i.e., no resolution deterioration is caused in a direction which orthogonally intersects the aforementioned direction. That is, the adaptive interpolation circuit enables to enhance a resolution by executing an interpolation according to the correlation of the image data around a portion to be interpolated.

30 Claims, 18 Drawing Sheets

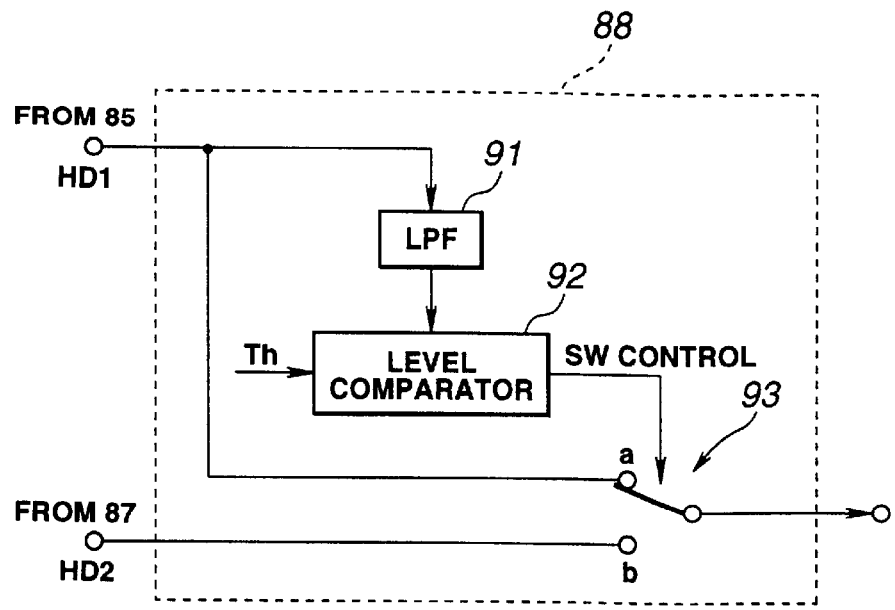
FIG.17
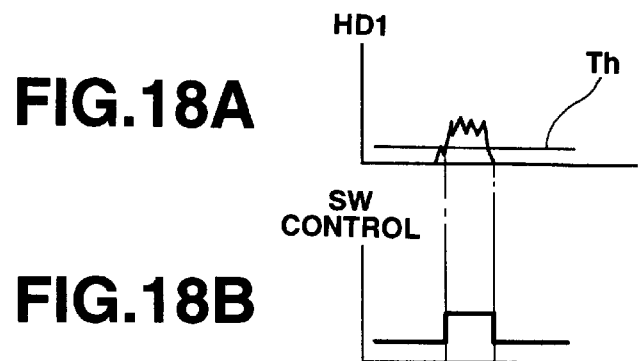
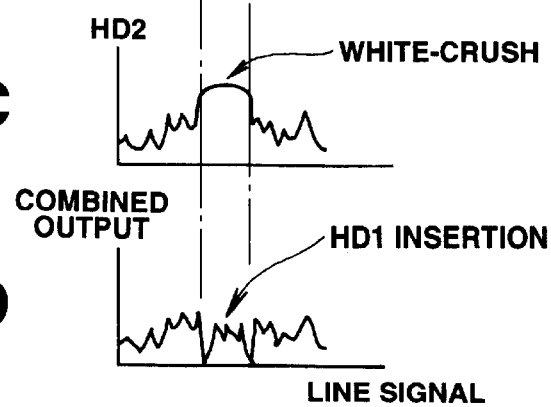
FIG.18A
FIG.18B
FIG.18C
FIG.18D

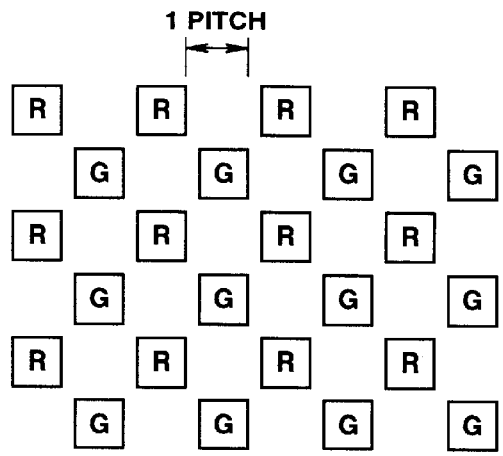
FIG.22
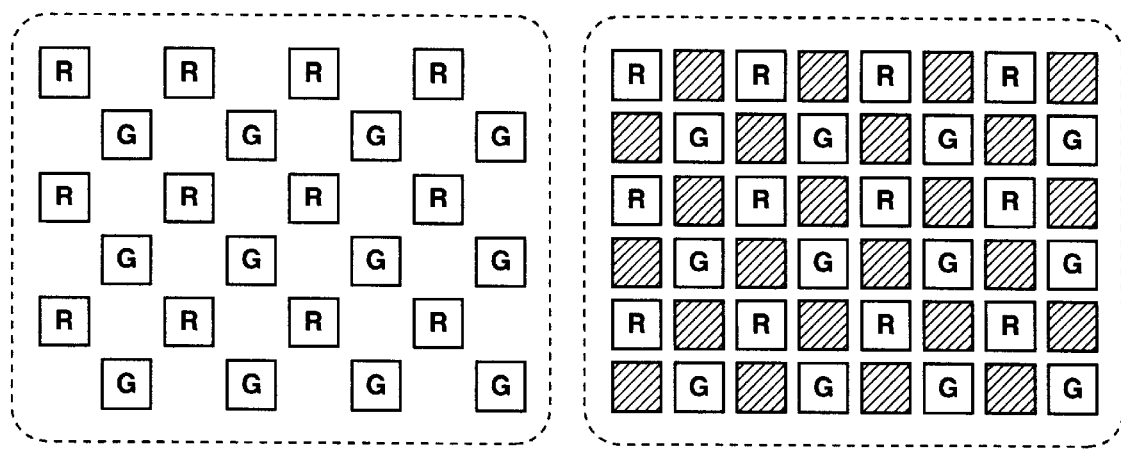
☐ : ORIGINAL PIXELS OF R/B
▧ : INTERPOLATION PIXELS
FIG.23A  FIG.23B

IMAGE PICKUP APPARATUS HAVING AN INTERPOLATION FUNCTION

BACKGROUND OF THE INVENTION

1. Field of the Invention

Present invention relates to a signal processing apparatus for increasing a resolution of a pickup image data by way of interpolation.

2. Description of the Related Art

Conventionally, there is known a single-plate type video camera using a single color CCD, However, as shown in FIG. 1, aliasing is caused in the CCD output of the G-checker R/B line sequential method.

There are also known two-plate type and three-plate type video cameras using two and three CCD. However, use of a plurality of CCD costs much and requires a complicated configuration of the apparatus.

There is also known a technique to obtain a high resolution by wobbling the CCD position by a bimorph or the like so as to combine a plurality of frame images obtained at different positions. However, this method also has a problem that the method is too much complicated.

SUMMARY OF THE INVENTION

It is therefore an object of the present invention to provide a signal processing apparatus enabling to obtain an image of a high resolution by way of interpolation of an image data picked-up.

The present invention provides an image pickup apparatus comprising: an image pickup element having a plurality of pixels arranged in a matrix state, each pixel outputting a sample information according to a light received; correlation value detecting means based on sample information from a plurality of pixels positioned in the vicinity of a reference sample within a frame composed by the sample information outputted from the respective pixels of the image pickup element, for detecting a correlation value of a plurality of sample information in a horizontal direction, a correlation value of a plurality of sample information in a vertical direction, and a correlation value of a plurality of sample information in a diagonal direction; and interpolation means based on the sample information of the pixels positioned in the direction having the greatest correlation value detected by the correlation value detecting means, for executing an interpolation for the reference sample position.

According to another aspect of the present invention, there is also provided a signal processing apparatus for executing an interpolation based on a reference sample position within a frame composed by sample information outputted from a plurality of pixels arranged in a matrix state and provided in an image pickup element which outputs sample information according to a light quantity received by each of the pixels, the interpolation being executed according to sample information of pixels around the reference sample position, the apparatus comprising: correlation value detecting means for detecting a correlation value of a plurality of sample information in the vertical direction, a correlation value of a plurality of sample information in the horizontal direction, and a correlation value of a plurality of sample information in the diagonal directions according to sample information of a plurality of pixels position in the vicinity of the reference sample position; and interpolation means for executing an interpolation for the reference sample position according to sample information of pixels positioned in a direction having the greatest correlation value detected by the correlation value detecting means.

According to still another aspect of the present invention there is provided an interpolation method for executing an interpolation according to sample information from a plurality of pixels positioned in the vicinity of a reference sample position within a frame composed by sample information outputted from an image pickup element having a plurality of pixels arranged in a matrix state, each pixel outputting a sample information according a received light quantity, wherein by detecting for the reference sample position a correlation value of a plurality of sample information in a vertical direction, a correlation value of a plurality of sample information in a horizontal direction, and a correlation value of a plurality of sample information in a diagonal direction, according to sample information from a plurality of pixels positioned in the vicinity of the reference sample position, the interpolation is executed for the reference sample position according to a sample information of pixels positioned in a direction having the greatest correlation value detected.

BRIEF DESCRIPTION OF THE DRAWINGS

FIG. 1 explains aliasing caused when using a conventional low-pass filter or the like.

FIG. 17 is a block diagram showing a configuration of an image combine section of the aforementioned image pickup apparatus.

FIG. 18A to FIG. 18D show signal level states of an image data.

FIG. 22 shows a pixel arrangement of the CCD image sensor of the aforementioned image pickup apparatus.

FIG. 23A and FIG. 23B show an arrangement of the image data R and G stored in the adaptive interpolation circuit and the arrangement of the luminance signal T interpolated.

DETAILED DESCRIPTION OF PREFERRED EMBODIMENTS

Description will now be directed to embodiments of the present invention with reference to the attached drawings.

An image pickup apparatus according to a first embodiment of the present invention is a single-plate type, enabling to obtain a high resolution, for example, by synthesizing a high frequency luminance component generated by an interpolation between pixels for respective signals obtained from a single CCD (charge coupled device) image sensor.

Figure 1:
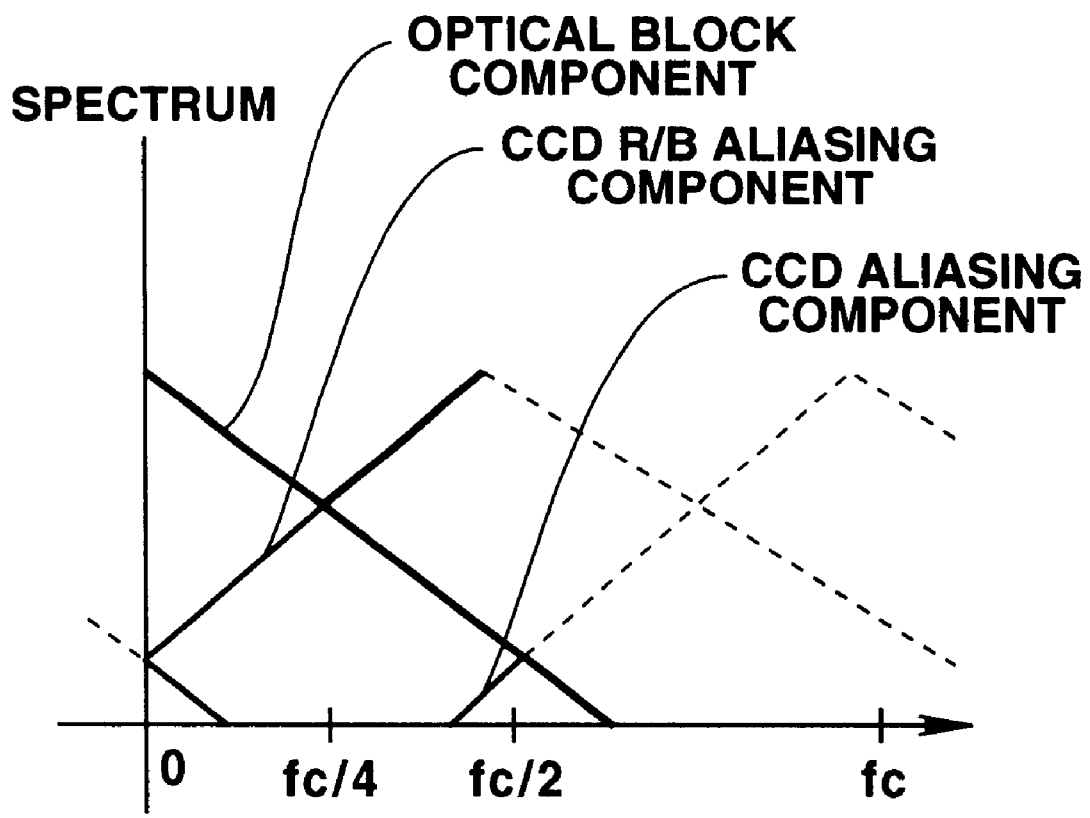
Figure 2:
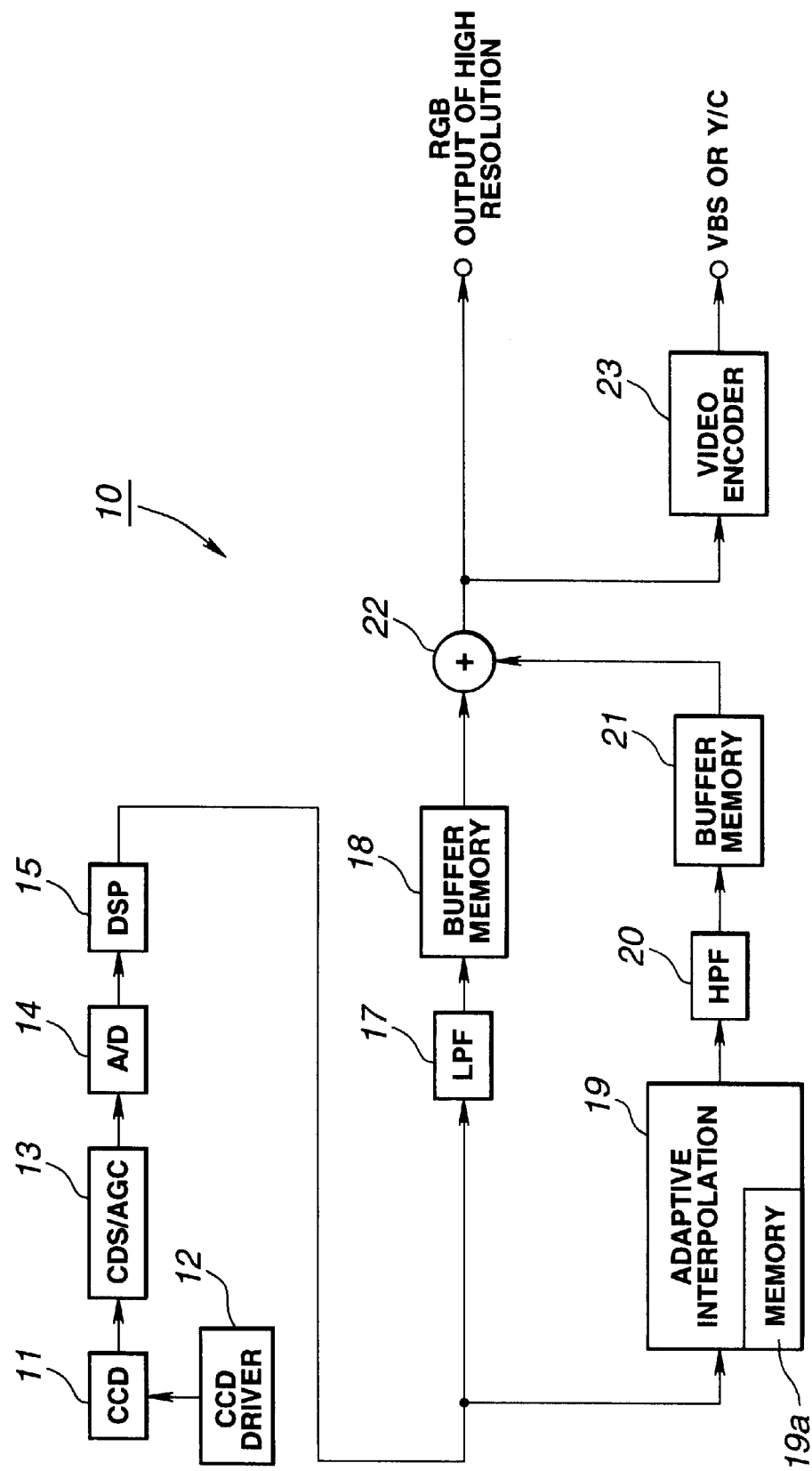
FIG. 2 is a block diagram of a configuration of an image pickup apparatus according to a first embodiment of the present invention.

FIG. 2 shows the image pickup apparatus 10 according to the first embodiment including: a single-plate CCD image sensor 11 driven by a CCD driver 12; a correlated double sampling/automatic gain control (CDS/AGC) circuit 13; an A/D converter 14; a digital signal processor (DSP) 15; a low pass filter (LPF) 17; a buffer memory 18; an adaptive interpolation circuit 19; a high pass filter (HPF) 20; a buffer memory 21; an adder circuit 22; and a video encoder 23.

Figure 3:
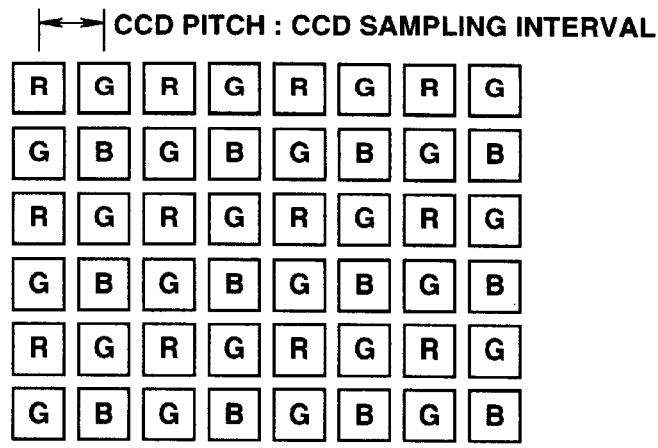
FIG. 3 shows an arrangement of CCD image sensors of the aforementioned image pickup apparatus in a form of checkers.

The CCD image sensor 11 is, for example, a progressive scan type consisting of, for example, checker arrangements of red (R) pixels, green (G) pixels, and blue (B) pixels as shown in FIG. 3. The CCD image sensor, upon reception of an incident light from an object, generates color signals R, G, and G according to the incident light for supply to the CDS/AGC circuit 13.

The CDS/AGC circuit 13 sampling-holds a precharge level and a data level for each of the color signals and detects differences so as to detect an accurate signal level for removing a random noise, and further automatically controls the gain of the CDS/AGC circuit itself according to the intensity of the respective signals so as to always output a pickup signal of a stable signal level.

The A/D converter 14 is designed so as to be driven according to a sampling pulse and to convert the respective color signals from the CDS/AGC circuit 13, into digital signals for supply to the DSP 15.

The DSP 15 executes a so-called digital signal processing such as γ-correction and knee processing to the respective color data and supplies the obtained color signals of the three primary colors to the LPF 17 and to the adaptive interpolation circuit 19.

The LPF 17 cuts off higher frequency components of the respective color signals R, G, and B and supplies color data RL, Gl, and BL of low frequency components through the buffer memory 18 to the adder circuit 22.

On the other hand, the adaptive interpolation circuit 19 calculates a local pixel correlation from the color signals R and G and executes interpolation with a pixel which maximizes the correlation so as to obtain a luminance signal of a high resolution.

Figure 4:
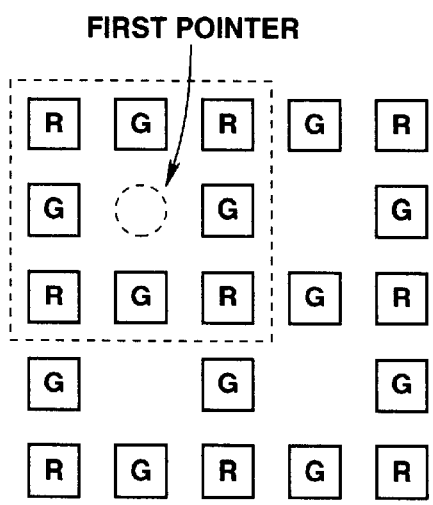
FIG. 4 shows a state when an R-G image data is combined in an internal memory.
Figure 5:
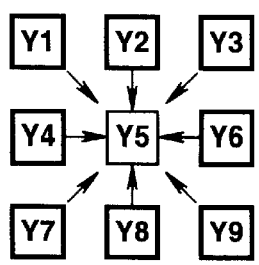
FIG. 5 shows an arrangement of luminance signal information items of the R-G image data.

Here, the adaptive interpolation circuit 19 is supplied with color signal R, G, and B which have been subjected to a white balance adjustment in the DSP 15 so that, as shown in FIG. 4, an R image and a G image are combined. Because the color signal R and the color signal G have been adjusted in the white balance adjustment to have an almost identical signal level, if an attention is paid on the information of the luminance signal Y of the color signals R and G, in the vicinity of 3×3 surrounded by a dotted line in FIG. 4, it can be assumed that the luminance signals Y1 to Y9 are arranged as shown in FIG. 5.

The correlation S can be defined for a pixel string Yn of a particular direction as follows.

$$S=\min(Yn)/\max(Yn)$$

Note that $S \leq 1$ and the maximum correlation is obtained when σ=1.

If the correlation is calculated for each of the vertical, horizontal, and inclined directions, and interpolation is executed in a direction which maximizes the correlation, the signal will not be subjected to the LPF in a direction which orthogonally intersects the interpolation direction and accordingly, the resolution in the orthogonal direction will no be deteriorated. In other words, the resolution can be improved by executing interpolation according to the correlation.

Figure 6:
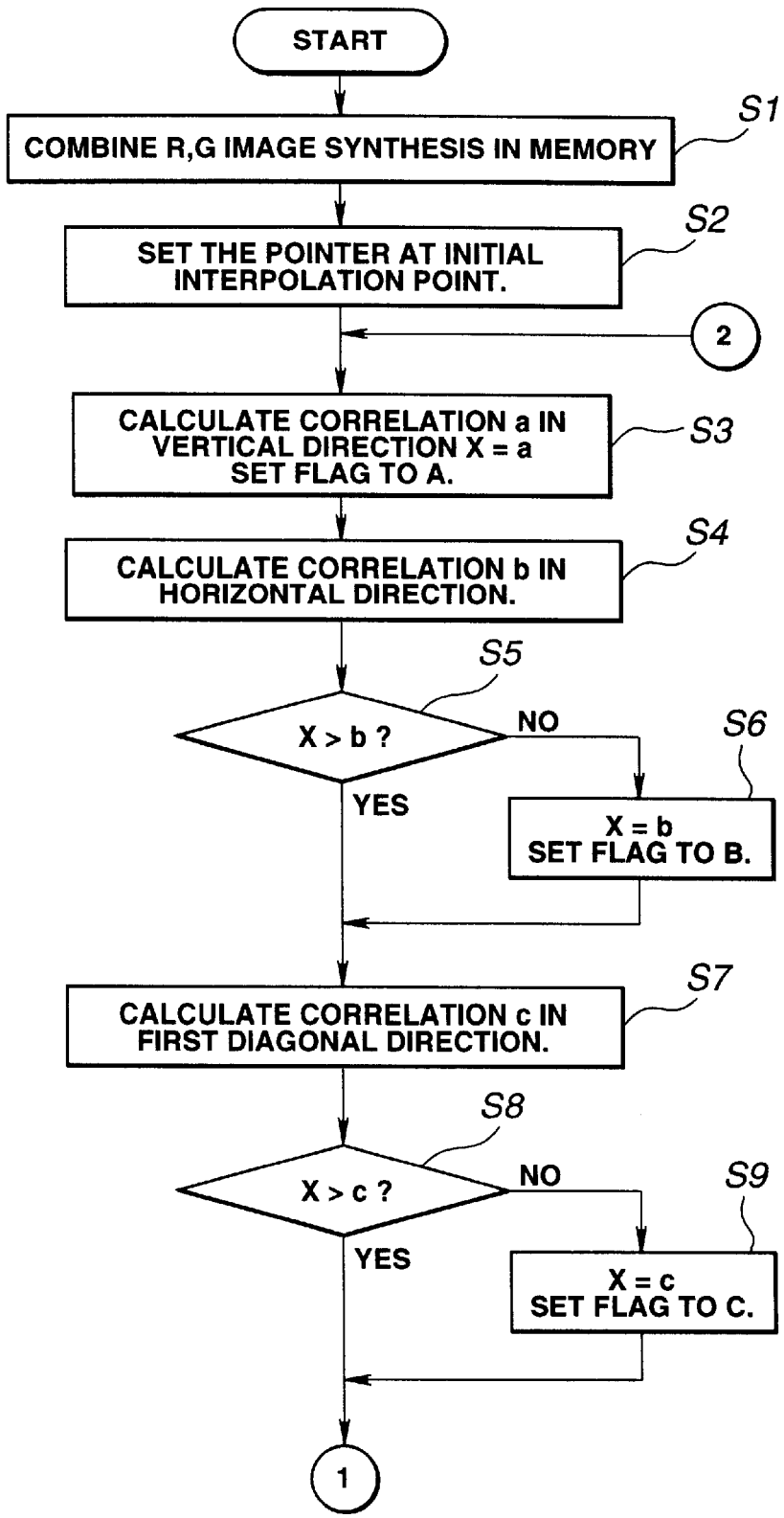
FIG. 6 is a flowchart for explanation of an adaptive interpolation.

For executing such an interpolation, the adaptive interpolation circuit 19 executes steps of FIG. 6, starting with step S1.

In step S1, the adaptive interpolation circuit 19 fetches only the color signals R and G into an internal memory 19a so as to obtain the R-G image of FIG. 4, and control is passed to step S2.

In step S2, a pointer is set at the initial image interpolation point and control is passed to step S3.

In step S3, the adaptive interpolation circuit 19 calculates a correlation a of the vertical direction. Here, the vertical correlation a is calculated according to an equation as follows.

$$a=\min(Yn)/\max(Yn)$$

min (Yn)=min (Y1, Y4, Y7)·min (Y2, Y8)·min (Y3, Y6, Y9)

max (Yn)=max (Y1, Y4, Y7)·max (Y2, Y8)·max (Y3, Y6, Y9)

The adaptive interpolation circuit 19 substitutes the calculated "a" for a variable X and sets A for a flag corresponding to this variable X. Control is passed to step S4.

In step S4, the adaptive interpolation circuit 19 calculates the horizontal correlation "b" according to an equation as follows, and control is passed to step S5.

$$b=\min(Yn)/\max(Yn)$$

min (Yn)=min (Y1, Y2, Y3)·min (Y4, Y5)·min (Y7, Y8, Y9)

max (Yn)=max (Y1, Y2, Y3)·max (Y4, Y5)·max (Y7, Y8, Y9)

In step S5, the adaptive interpolation circuit 19, for comparison of the vertical correlation to the horizontal correlation, detects whether the value X is greater than the correlation b. If X is greater, control is passed to step S7, and if X is not greater, control is passed to step S6.

In step S6, the adaptive interpolation circuit 19 substitutes the correlation b for the variable X and sets a flag for B, passing control to step S7.

In step S7, the adaptive interpolation circuit calculates a correlation "c" in the direction connecting the upper left to the lower right (which will be referred to as a first diagonal direction) according to an equation as follows, and control is passed to step S8.

$$c=\min(Yn)/\max(Yn)$$

min (Yn)=min (Y2, Y6)·min (Y4, Y8)
max (Yn)=max (Y2, Y6)·max (Y4, Y8)

Figure 7:
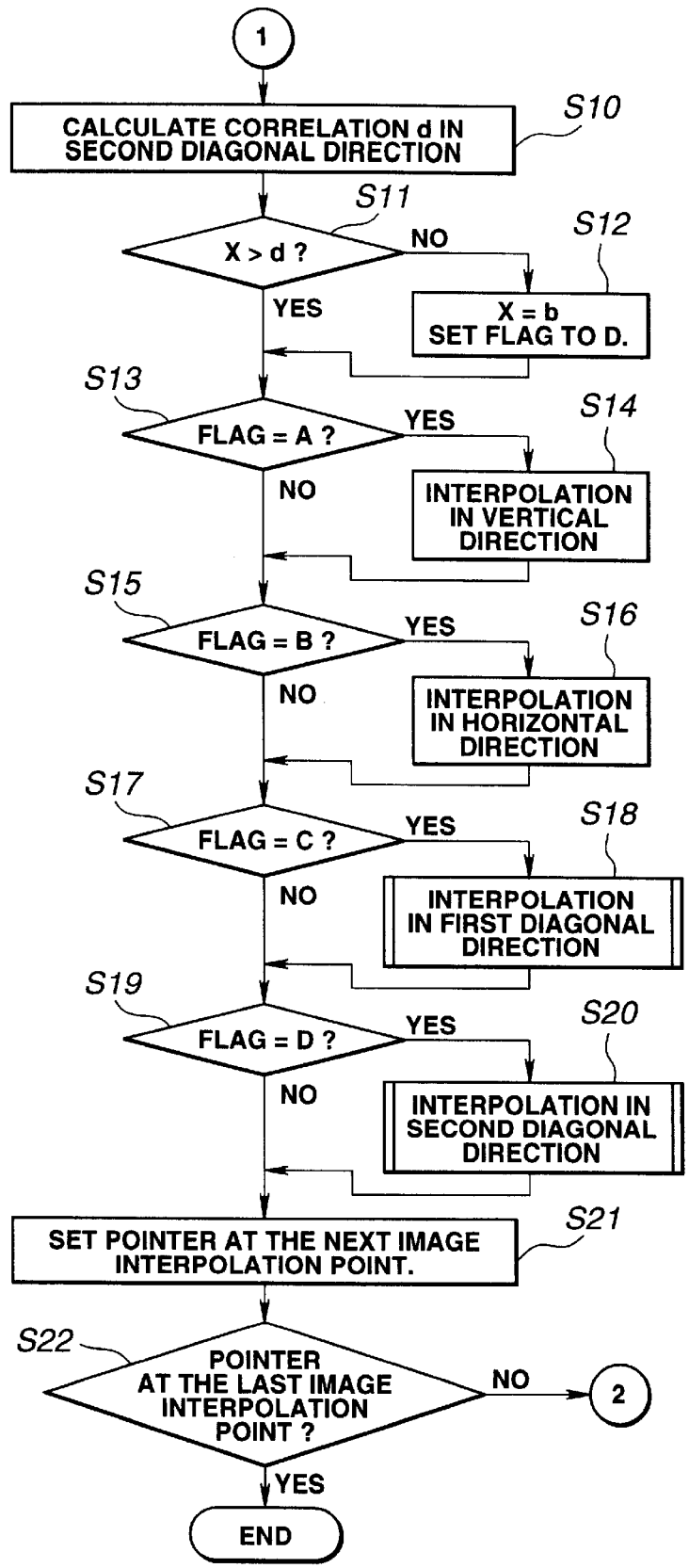
FIG. 7 is a flowchart for explanation of an adaptive interpolation.

In step S8, the adaptive interpolation circuit 19 detects whether the variable X is greater than the value c. If the variable X is greater than the value c, control is passed step S10 shown in FIG. 7, and if the variable X is not greater than the value c, control is passed to step S9.

In step S9, the adaptive interpolation circuit 19 substitutes the value of the correlation c for the variable X and set a flag for C, passing control to step S10.

In step S10, the adaptive interpolation circuit 19 calculates a correlation "d" of the direction connecting the lower left to the upper right (which will be referred to as a second diagonal direction) according to an equation as follows and passes control to step S11.

$$d=\min(Yn)/\max(Yn)$$

min (Yn)=min (Y2, Y4)·min (Y6, Y8)
max (Yn)=max (Y2, Y4)·max (Y6, Y8)

In step S11, the adaptive interpolation circuit 19 detects whether the correlation is greater than the variable X. If the variable X is greater, control is passed to step S13, and if X is not greater, control is passed to step S12.

In step S12, the adaptive interpolation circuits 19 substitutes the correlation d for the variable X and sets the flag to D, passing control to step 13.

In step S13, the adaptive interpolation circuit 19 determines whether the flag set for the variable X is A. If the flag is A, interpolation of the vertical direction is executed (step S14) and if the flag is not A, control is passed to step S15. In step S14, the adaptive interpolation circuit 19 calculates an average of the luminance signals Y in the vertical direction for Y5 such as (Y2+Y8)/2 and executes interpolation of the vertical direction.

In step S15, the adaptive interpolation circuit 19 detects whether the flag is B. If the flag is B, interpolation of the horizontal direction is executed (step S16), and if the flag is not B, control is passed to step S17. in step S16, the adaptive interpolation circuit 19 calculates an average of luminance signals in the horizontal direction for Y5 such as (Y4+Y6)/2 and executes interpolation of the horizontal direction.

In step S17, the adaptive interpolation circuit 19 detects whether the flag is C. If the flag is C, interpolation of the first diagonal direction is executed (step S18) and if the flag is not C, control is passed to step S19. In step 18, the adaptive interpolation circuit 19 calculates an average of the luminance signals Y of the first diagonal direction for Y5 such as (Y1+Y9)/2 and executes the interpolation of this diagonal direction.

In step S19, the adaptive interpolation circuit 19 detects whether the flag is D. If the flag is found to be D, interpolation of the second diagonal direction is executed (step S20), and if the flag is not D, control is passed to step S21. In step S20, the adaptive interpolation circuit 19 calculates an average of the luminance signals Y of the second diagonal direction for Y5 such as (Y3+Y7)/2 and executes interpolation of this diagonal direction.

In step S21, the adaptive interpolation circuit 19 sets a pointer at a following image interpolation point and passes control to step S22.

In step S22, the adaptive interpolation circuit 19 detects whether the pointer has been set at the last image interpolation point. If the pointer is found to be set at the last image interpolation point, the interpolation is terminated. If the pointer is not set at the last image interpolation point, control is returned to step S3 so as to execute the image interpolation of step S3 and after.

As has thus far been described, the adaptive interpolation circuit 19 can represent the adaptive interpolation as follows:

$$Y5=aY1+bY2+cY3+dY4+eY6+fY7+gY8+hY9,$$

so as to obtain the correlation of the surrounding pixels and set a to h, thus enabling to execute the optimal adaptive interpolation. It should be noted that instead of the correlation, it is possible to calculate according to similarities between the pixels.

Figure 8:
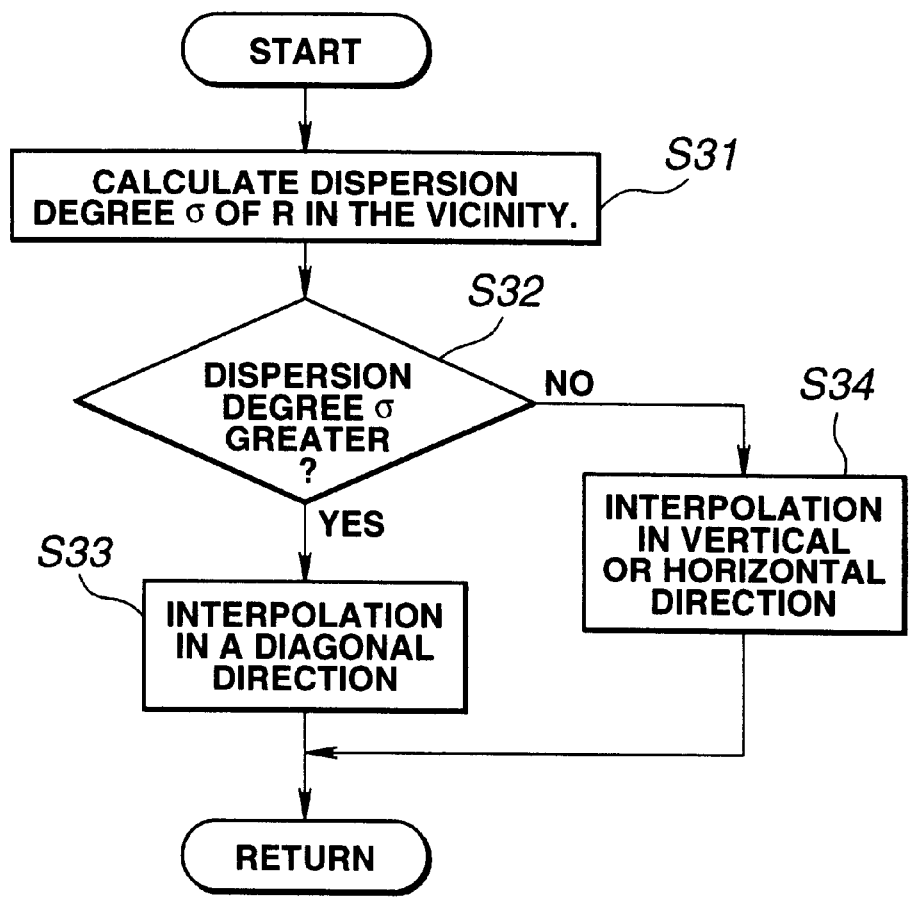
FIG. 8 is a flowchart for explanation of an adaptive interpolation.

Here, in step S18 and step S20, a subroutine shown in FIG. 8 is executed.

In step S31, the adaptive interpolation circuit 19 calculates a dispersion degree a of the color signal R in the vicinity of the pointer.

A dispersion degree $\sigma$ of the same color indicates a dispersion of a difference from the average value in a local vicinity. For example, if the dispersion degree $\sigma$ is small, the correlations of that color are identical in any of the directions and no effect of the adaptive interpolation is obtained. That is, if $\sigma R$ is small, it is sufficient to execute the adaptive interpolation of the vertical and horizontal directions for the color signal G without using the color signal R.

Figure 9:
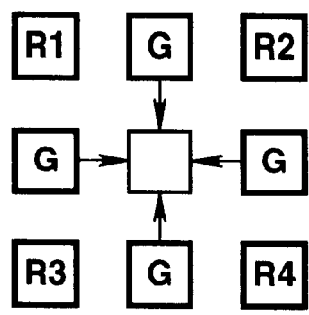
FIG. 9 is to be used for explanation of the R and G states when executing an adaptive interpolation according to the dispersion degree.

Here, if the dispersion degree $\sigma$ is defined as follows:
$\sigma$ color=min (all the pixels the color)/max (all the pixels of the color), then the case of FIG. 9 is expressed as follows:

$$\sigma R=\min(R1, R2, R3, R4)/\max(R1, R2, R3, R4).$$

In step S32, the adaptive interpolation circuit 19 detects whether the dispersion degree $\sigma$ is greater than a predetermined value. If the dispersion degree is greater than the predetermined value, control is passed to step S33, and if not greater, control is passed to step S34.

In step S33, the adaptive interpolation circuit 19 executes interpolation of the diagonal directions as follows. If a processing from step S18 is executed, interpolation of the first diagonal direction is executed. If a processing from step S20 is executed, interpolation of the second diagonal direction is executed, terminating the subroutine.

On the other hand, if in step S32, the dispersion degree $\sigma$ is found not greater than the predetermined value, control is passed to step S34 where the adaptive interpolation circuit 19 executes an interpolation in the vertical direction having the correlation "a" calculated in step S3 or in the horizontal direction having the correlation "b" calculated in step S4. If a is greater than b, a vertical interpolation is executed, and if a is smaller than b, a horizontal interpolation is executed, terminating the subroutine.

That is, in the adaptive interpolation circuit 19, when the dispersion degree σ is great, interpolation of a diagonal direction is executed, and when the dispersion degrees σ is small, correlation of the color (R) is almost identical in any of the directions and the effect of the adaptive interpolation is not so great, which leads to interpolation of the vertical or the horizontal direction of only G which has the highest frequency without using R. In other words, when the dispersion degree σ is small, in order to eliminate a slight difference between the adaptive interpolation of different levels of R and G of a color image, the interpolation is executed only with G having the highest frequency and the highest level, thus enabling to obtain an image of a higher resolution.

Figure 10:
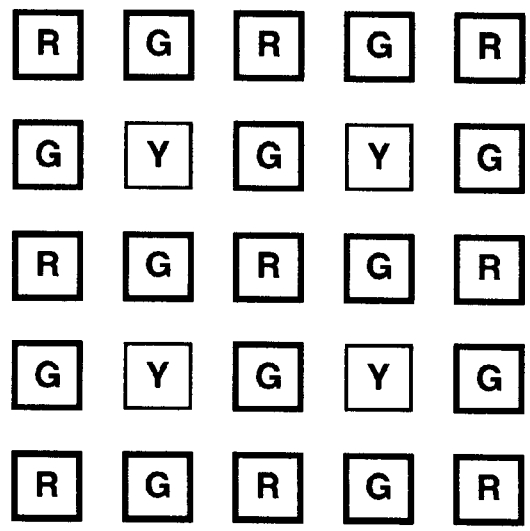
FIG. 10 shows an arrangement of the R-G image and a luminance signal Y after executing the interpolation processing.

When the luminance signal Y is interpolated by the processing as described above, the adaptive interpolation circuit 19 supplies the HPF 20 with the luminance signal Y and the color signals R and G shown in FIG. 10.

Figure 11:
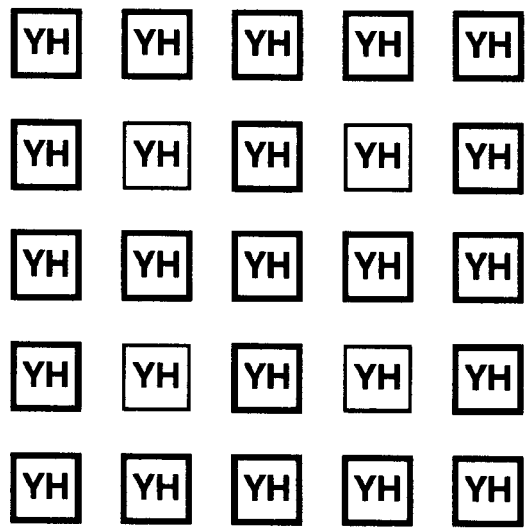
FIG. 11 shows a state when a luminance signal YH of a higher frequency component is generated.

The HPF 20 cuts off a lower frequency component from the luminance signal obtained by the adaptive interpolation circuit 19, so as to create a luminance signal YH of a higher frequency component as shown in FIG. 11 and supplies this higher frequency luminance signal YH via the buffer memory 21 to the adder circuit 22.

The adder circuit 22 combines the lower frequency components of the respective color signals RL, GL, and BL with the higher frequency component luminance signal YH and outputs color signals R, G, and B of a high resolution. Moreover, the video encoder 23 encodes the color signals R, G, and B of a high resolution generated in the adder circuit 22, into a video signal of, for example NTSC (National Television System Committee) type for supply to an external monitor apparatus (no depicted).

As has been described above, in the image pickup apparatus 10 according to the present embodiment, by executing the adaptive interpolation of the R and G pixels from the color filter arrangement, it is possible to improve a resolution not only in the vertical and the horizontal direction but also in the diagonal directions. Moreover, because the apparatus is a single-plate type, the apparatus of a compact size is available at a low price and nonetheless it is possible to obtain a high resolution which is equivalent to that of the 3CCD type without using a separate mechanism such as a pixel shift mechanism. Furthermore, in the image pickup apparatus 10 which enables to obtain a high resolution without using a pixel shift mechanism or the like, it is possible to employ an electronic shutter. The image pickup apparatus 10 uses the CCD image sensor 11 of progressive scan type and accordingly, it is possible to obtain a non-interlace image which is appropriate for a personal computer monitor apparatus and the like.

Description will now be directed to a second embodiment of the present invention. Note that like circuits as in the first embodiment will be denoted with the same symbols and their explanation will be omitted. The same applies to the other embodiments which will be described later.

Figure 12:
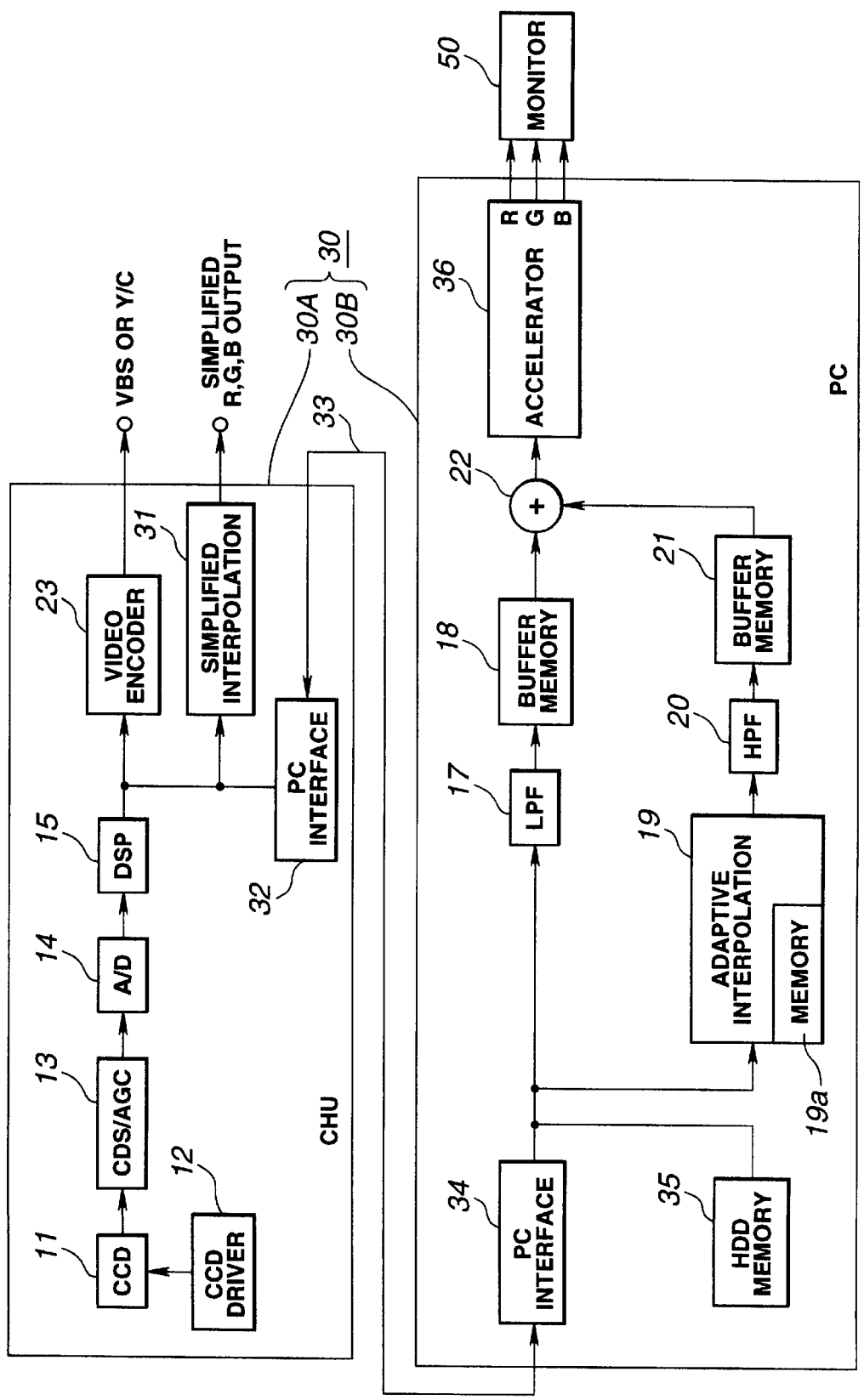
FIG. 12 is a block diagram showing a configuration of an image pickup apparatus according to a second embodiment of the present invention.

FIG. 12 is a block diagram of an image pickup apparatus 30 according to the second embodiment consisting of an image pickup block 30A and a computer block 30B. Color signals R, B, and B obtained in the image pickup block 30A are subjected to the adaptive interpolation by a software of the computer block 30B.

The image pickup block 30A, as shown in FIG. 12 for example, includes: a CCD image sensor 11; a CCD driver 12 for driving the CCD image sensor 11; a CDS/AGC circuit 13 for executing a correlated double sampling and gain control to the respective color signals from the CCD image sensor; an A/D converter 14 for digitizing the respective color signals from the CDS/AGC circuit 13; a DSP 15 for executing a digital signal processing to the digitized color signals from the A/D converter; and a video encoder 23 for converting the color signals from the DSP 15, into video signals. These circuits have the same functions as in the first embodiment.

Moreover, the image pickup block 30A is provided with a simplified interpolation circuit 31 for executing a simplified interpolation to the respective signals from the DSP 15 and a personal computer interface (hereinafter, referred to as PC interface) 32 for executing a predetermined signal conversion for transmitting the color signals from the DSP 15, to the computer block 30B so that interpolated color signals are outputted. The image pickup block 30A is arranged so as to transmit the respective color signals via a bi-directional bus 33 to the computer block 30B and receive a control signal from the computer block 30B.

On the other hand, the computer block 30B includes: a personal computer (PC) interface 34 which is preferable for use in a personal computer and in which respective color signals are transmitted via a bi-directional bus 33; a hard disk drive (HDD) memory 35 for storing a program and the like; an LPF 17 for cutting off a higher frequency component from the respective color signals from the PC interface 34; a buffer memory 18 for storing the respective color signals from the LPF 17; an adaptive interpolation circuit 19 for executing the adaptive interpolation to the respective color signals from the PC interface 34; a HPF 20 for cutting off a lower frequency component from the respective color signals from the adaptive interpolation circuit 19; a buffer memory 21 for storing a luminance signal YH from the HPF 20; an adder circuit 22 for adding the signals from the buffer memory 18 and the buffer memory 21; and an accelerator 36 for outputting to a monitor 50 the respective color signals from the adder circuit 22.

In the image pickup apparatus 30 having the aforementioned configuration, the CCD image sensor 11 generates color signals R, G, and B for supply to the DSP 15 via the CDS/AGC circuit 13 and the A/D convert 14. An output from the DSP 15 is converted into a video signal by the video encoder 23 and is outputted as a VBS (video, burst, sync) signal or luminance/color difference signal Y/C. Moreover, the output of the DSP 15 is subjected to a simplified interpolation in the simplified interpolation circuit 31 and outputted as a color signal or transmitted via the PC interface 32 to the computer block 30B.

In the computer block 30B, the PC interface 34 supplies the respective color signals to the adaptive interpolation circuit 19 and to the LPF 17. The LPF 17 removes a higher frequency component from the respective color signals and supplies the color signals via the buffer memory 18 to the adder circuit 22.

The adaptive interpolation circuit 19 executes an adaptive interpolation by carrying out the aforementioned steps S1 to S22 and steps S31 to S34, and supplies the HPF 20 with a luminance signal Y and respective color signals R, G, and B shown in FIG. 10. The HPF 20 removes a lower frequency component from the luminance signal Y and the respective color signals and supplies the obtained luminance signal YH of higher frequency via the buffer memory 21 to the adder circuit 22.

The adder circuit 22 adds the luminance signal Y of the higher frequency to the respective color signals RL, GL, and BL from the buffer memory 19 and supplies the generated color signals R, G, and B of a high resolution via the accelerator 36 to the monitor 50.

As has thus far been described, in the image pickup apparatus 30 according to the second embodiment, the adaptive interpolation is executed by a software in the personal computer, which enables to reduce the size and weight of the image pickup block 30A as well as to revise the software without replacing the image pickup block 30A. Moreover, by executing the adaptive interpolation for the R and G pixels from the color filter arrangement, it is possible to improve the resolution not only in the vertical and the horizontal directions but also in diagonal directions. Furthermore, the aforementioned image pickup apparatus 30 which uses a single CCD is available at a reasonable price in a compact size and simultaneously with this, enables to obtain a high resolution and employ an electronic shutter. Moreover, because the image pickup apparatus 30 employs the CCD image sensor 11 of progressive scan type, it is possible to obtain a non-interlace image which is preferable for a personal computer monitor or the like.

Description will now be directed to a third embodiment of the present invention.

Figure 13:
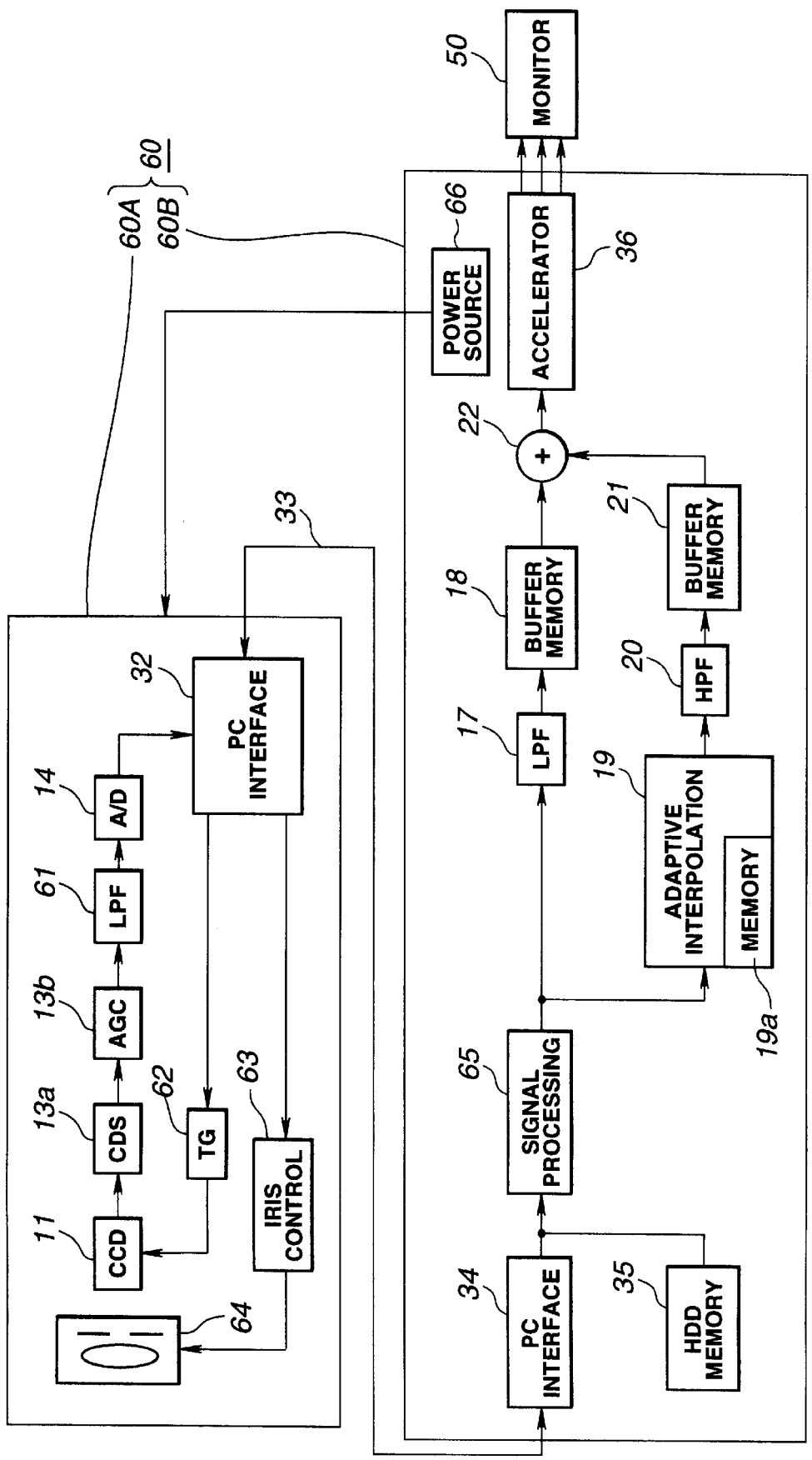
FIG. 13 is a block diagram showing a configuration of an image pickup apparatus according to a third embodiment of the present invention.
Figure 14:
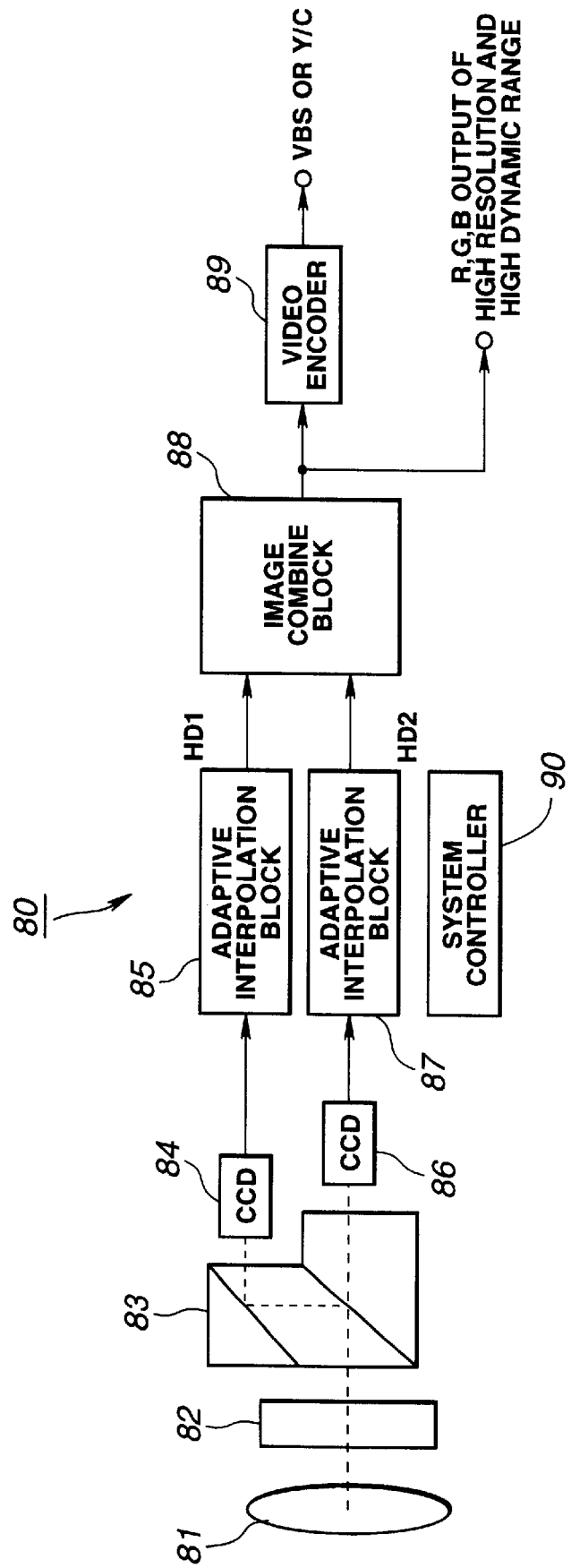
FIG. 14 is a block diagram showing a configuration of an image pickup apparatus according to a fourth embodiment of the present invention.

An image pickup apparatus 60 according to the third embodiment is preferable for use in a still image camera. As shown in FIG. 13, the image pickup apparatus 60 operates only for the moment of pickup of main circuits in an image pickup block 60A which can be preferably used in a camera head unit (CHU) and is kept in a wait mode when no pickup request is made from a computer block 60B, thus saving the electric energy.

As shown in FIG. 13 for example, the image pickup block 60A includes: a CCD image sensor 11; a CDS circuit 13a for executing a correlated double sampling to respective color signals from the CCD image sensor 11; an AGC circuit 13b for controlling a gain of the respective color signals from the CDS circuit 13a; an LPF 61 for removing a higher frequency component from the respective color signals from the AGC circuit 13b; an A/D converter 14 for digitizing the respective color signals from the LPF 61; a personal computer interface 32 for executing a predetermined signal conversion on the respective color signals from the A/D converter; a timing generator 62 for generating a read-out pulse and the like for driving the CCD image sensor 11; an iris control circuit 62; and a lens block 64 for adjusting the iris according to the iris control circuit 63.

The CCD image sensor 11 is supplied with an electronic shutter pulse from the timing generator 62 so as to control an effective charge accumulation period (electronic shutter cycle). Here, there is no problem if the electronic shutter cycle is set to a period of a single frame or several frames for still image pickup. The timing generator 62 supplies the CCD image sensor 11 with a clock at a low frequency.

The PC interface 32 turns on functions of main circuits according to a pickup mode request from the computer block 60B and turns off the functions of the main circuits excluding the PC interface 32 according to a wait mode request. Consequently, the image pickup block 60A suppresses power consumption in the wait mode, thus saving electric energy.

The computer block 60B includes: a personal computer interface 34; an HDD memory for storing programs and the like; a signal processing circuit 65 for executing a predetermined signal processing on the respective color signals from the personal computer interface 34; an LPF 17 for removing a higher frequency components from the respective color signals from the signal processing circuit 65; a buffer memory 18 for storing the respective color signals from the LPF 17; an adaptive interpolation circuit 19 for executing an adaptive interpolation for the respective color signals from the personal computer interface 34; a HPF 20 for removing a lower frequency component from the respective color signals from the adaptive interpolation circuit 19; a buffer memory 21 for storing the respective color signals from the HPF 20; an adder circuit 22 for adding the signals from the buffer memory 18 and the buffer memory 21; an accelerator 36 for outputting to a monitor 50 the respective color signals from the adder circuit 22; and a power source circuit 66 for supplying power to the image pickup block 60A.

Mode switching of the image pickup block 60A is carried out through keyboard operation while the camera control software in the computer block 60B is operating. That is, the electronic shutter control, iris control and wait mode control provided in the image pickup block 60A are carried out by the computer block 60B. The adaptive interpolation and the digital signal processing executed to the respective color signals from the image pickup block 60A are also executed by the adaptive interpolation circuit 19 and the signal processing circuit 65 in the computer block 60B.

In the image pickup apparatus 60 having the aforementioned configuration, when the apparatus is set to the wait mode according to control form the computer block 60B, the image pickup block 60A is not supplied. with power from the power source circuit 66 and functions of the main circuit are terminated excluding the personal computer interface 32.

When the image pickup block 60A is set to a pickup mode with power supply from the power source circuit 66, functions of the main circuits start functioning. At this moment, for example, the computer block 60B, according to input through keyboard operation, can adjust the iris via the PC interface 32 and the iris control circuit 63.

Moreover, when the computer block 60B transmits an image pickup request to the image pickup block 60A, the CCD image sensor 11 supplies the PC interface 32 through the CDS circuit 13a, the AGC circuit 13b and the like with respective color signals obtained for the electronic shutter cycle for a single-frame period or several-frame period. The PC interface 32 executes a predetermined signal conversion processing to the respective color signals, which are then supplied via the bi-directional bus 33 to the PC interface 34.

In the computer block 60B, the signal processing circuit 65 executes the digital signal processing on each of the color signals from the PC interface 34 and supplies the obtained color signals via the LPF 17 to the adder circuit 22 as well as to the adaptive interpolation circuit 19. From the respective color signals R, G, and B from the signal processing circuit 65, the adaptive interpolation circuit 19 generates a luminance signal Y of a high resolution, which is supplied via the HPF 22 to the adder circuit 22. The adder circuit 22 combines the respective color signals RL, GL, and BL with the luminance signal YH of a high resolution for output. Thus, color signals R, G, and B of a high resolution are generated for supply via the accelerator 36 to the monitor 50.

As has thus far been described, the image pickup apparatus 60 according to the third embodiment operates the image pickup block 60A only during a pickup operation and terminate functions of the main circuits in the pickup block 60A when in the wait mode, thus enabling to save electric power. Moreover, the image pickup apparatus 60 executes not only the adaptive interpolation but also digital signal processing such as knee γ-correction by way of the software processing in the computer block 60B and accordingly, the image pickup block 60A can be reduced in size and weight and need not be replaced when the aforementioned software is revised. Furthermore, by executing the adaptive interpolation with the R and G pixels from the color filter arrangement, it is possible to improve resolution in al the directions not only in the vertical and the horizontal directions but also in diagonal directions. The aforementioned image pickup apparatus 60 is a single-plate type and accordingly, available at a reasonable price and in a compact size, and enables to obtain a high resolution without using a pixel shift mechanism or the like.

Description will now be directed to an image pickup apparatus according to a fourth embodiment. The image pickup apparatus according to the fourth embodiment enlarges the dynamic range using two pickup elements, enabling to obtain an image of a high resolution.

FIG. 4 is a block diagram showing an example of configuration of the image pickup apparatus 80 according to the fourth embodiment including: a pickup lens 81 for focusing a pickup light; an optical filter 82 for color isolation of the pickup light; a half mirror block 83; CCD image sensors 84 and 86 into which the pickup light is introduced via the half mirror block 83; an adaptive interpolation section 85 for executing an adaptive interpolation to a pixel signal from the CCD image sensor 84; an adaptive interpolation section 87 for executing an adaptive interpolation to a pixel signal from the CCD image sensor 86; an image combine section 88 for synthesizing color signals from the adaptive interpolation sections 85 and 87; a video encoder 89 for converting the respective color signals which have been combined in the image combine section 88, into predetermined video signals; and a system controller 90 for controlling the entire apparatus.

Here, the CCD image sensors 84 and 86 are, for example, of the progressive scan type in which red pixels (R), green pixels (G), and blue pixels (B) are respectively arranged in checker arrangement as shown in FIG. 3.

Figure 15:
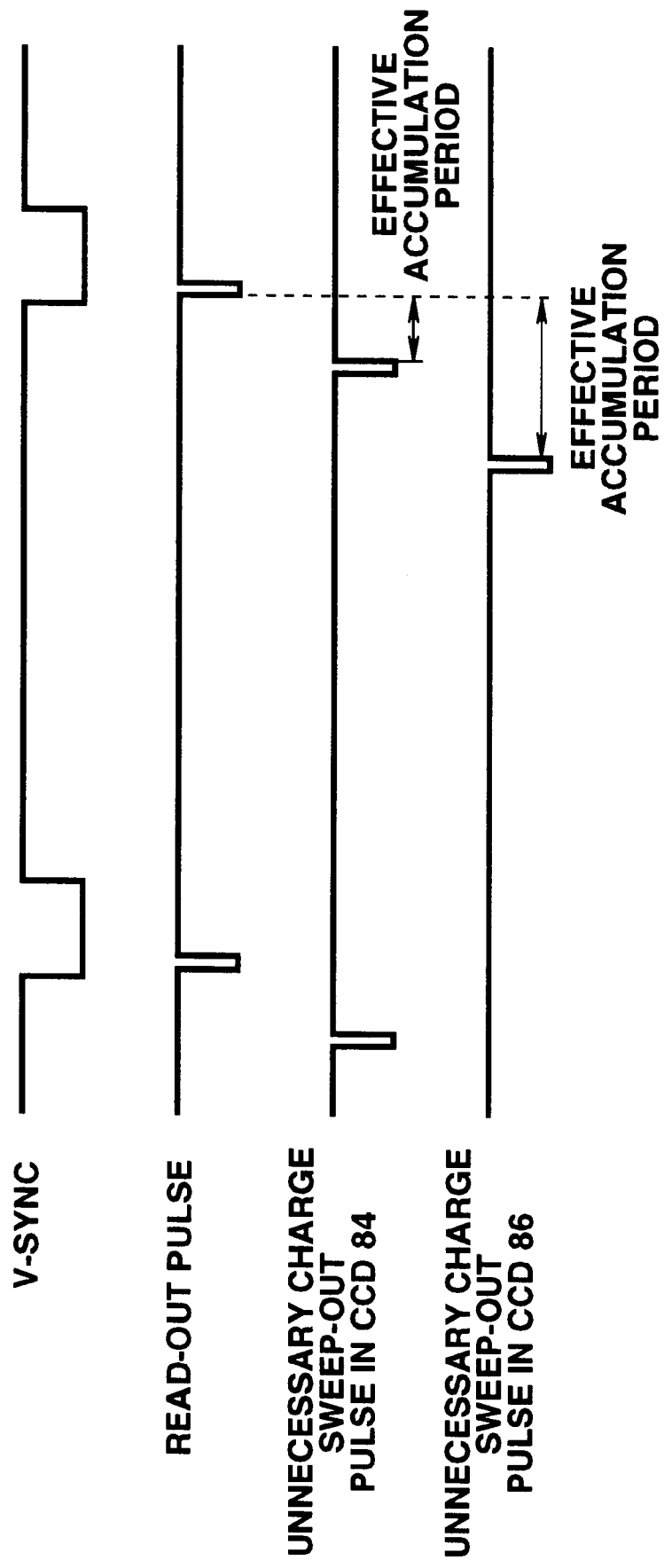
FIG. 15 is a timing chart for explanation of effective charge accumulation periods of the CCD image sensors of the aforementioned pickup apparatus.

As shown in FIG. 15, in the CCD image sensor 84, the effective charge accumulation period (preferable for the electronic shutter function) is set to a shorter value than in the CCD image sensor 86. Consequently, the CCD image sensor 84 outputs color signals of lower signal level as a whole compared to the CCD image sensor 86.

Figure 16:
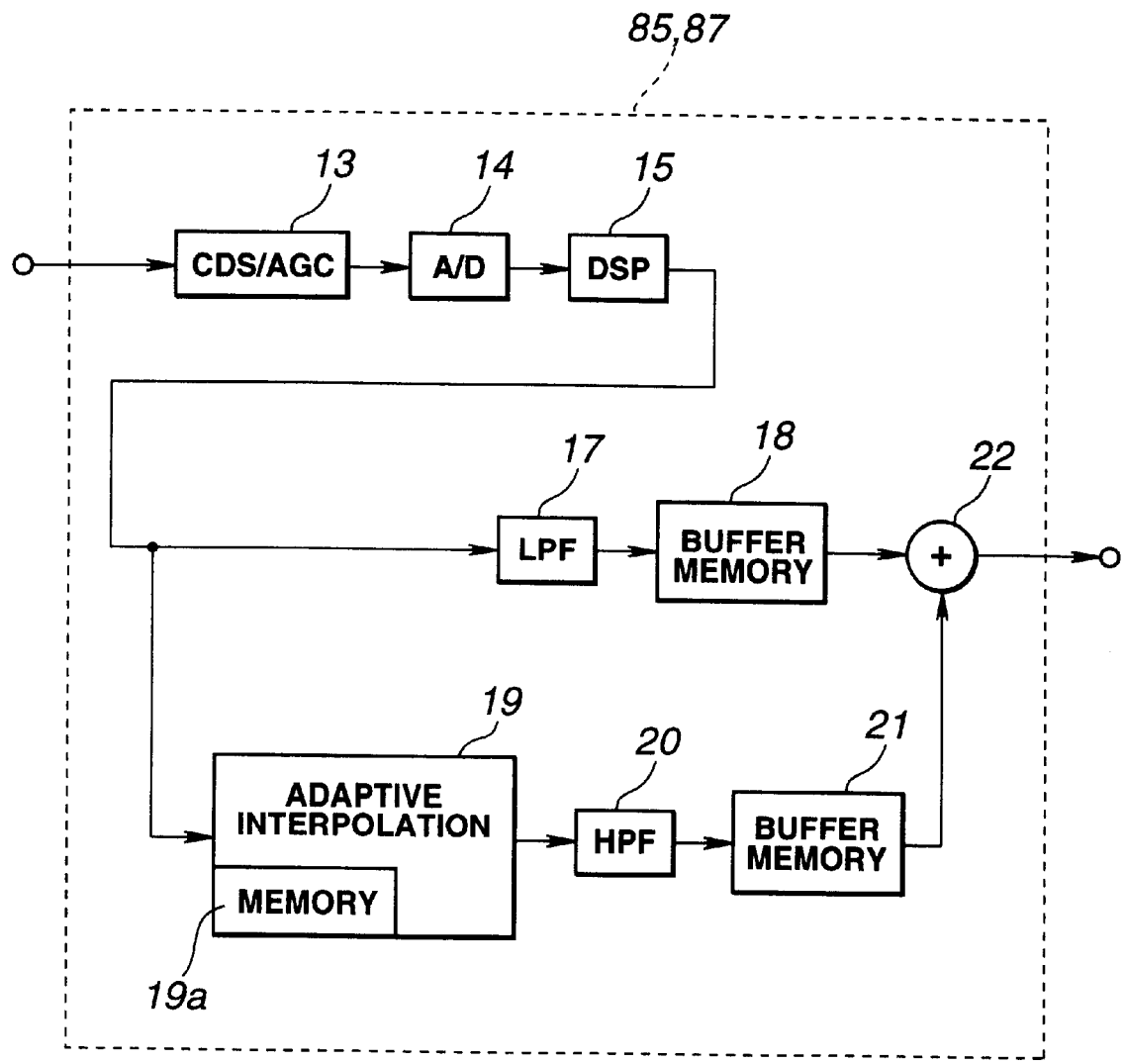
FIG. 16 is a block diagram showing a configuration of an adaptive interpolation section of the aforementioned image pickup apparatus.

Here, the adaptive interpolation section 85 and the adaptive interpolation section 87 have an identical configuration. As shown in FIG. 16, each of the adaptive interpolation sections 85 and 87 includes: a CCD/AGC circuit 13 for executing a correlated double sampling to the respective color signals from the CCD image sensor 84, 86; an A/D convert 14 for digitizing the respective color signals from the CDS/AGC circuit 13; and a DSP 15 for executing a digital signal processing to the respective color signals which have been digitized by the A/D converter 14.

Each of the adaptive interpolation sections 85 and 87 further includes: an LPF 17 for removing a higher frequency component from the respective color signals supplied from the DSP 15; a buffer memory 18 for storing the respective color signals from the LPF 17; an adaptive interpolation circuit 19 for executing an adaptive interpolation to the respective color signals from the DSP 15; an HPF 20 for removing a lower frequency component from the respective color signals from the adaptive interpolation circuit 19; a buffer memory 21 for storing the respective color signals from the HPF 20; and an adder circuit 22 for adding the color signals from the buffer memory 18 and the buffer memory 21.

The image combine section 88 is provided with, as shown in FIG. 17 an LPF 91, a level comparator 92, and a switching circuit 93 for selectively outputting the respective color signals of a lower signal level from the adaptive interpolation section 85 and the respective color signals of a normal signal level from the adaptive interpolation section 87.

The LPF 91 removes an unnecessary component of a higher frequency from an image data supplied from the adaptive interpolation section 85 and supplies the obtained color signals to the level comparator 92.

The level comparator 92 compares levels of the respective color signals HD1 to a threshold level Th, i.e., a limit of the dynamic range as shown in FIG. 18A. If this threshold level is exceeded, the image is sort of white-crushed. As shown in FIG. 18B, if the level of a color signal HD1 is higher than the threshold level, a switch control signal of H level is outputted.

The switching circuit 93 has a terminal 'a' which is supplied with color signals HD1 from the adaptive interpolation section 85 and a terminal 'b' which is supplied with color signals HD2 from the adaptive interpolation block 87. When supplied with a switch control signal of H level from the level comparator 92, the switching circuit 93 outputs the color signals HD1 supplied to the terminal 'a'. When supplied with a signal of L level from the level comparator 92, the switching circuit 93 outputs the color signals HD2 supplied to the terminal 'b'.

In other words, the terminal 'a' of the switching circuit 93 is supplied with the respective color signals HD1 shown in FIG. 18A, whereas the terminal 'b' of the switching circuit is supplied with the respective color signals HD2 shown in FIG. 18C. Because the switch control signal is at L level while no color signals HD2 exceed the dynamic range, the switching circuit 93 outputs the color signals HD2 as shown in FIG. 18D. When the color signals HD2 exceed the dynamic range, the switch control signal is at H level and, as shown in FIG. 18D, the switching circuit 93 outputs color signals HD1.

Consequently, when taking an outdoor picture from indoor for example, if the color signals HD2 exceed the dynamic range, the image combine section 88 substitutes the color signals HD1 for the portion exceeding the dynamic range, thus enabling to extend the dynamic range.

As has thus far been described, the image pickup apparatus 80 executes the adaptive interpolation for each of the output signals from the two CCD image sensors, which enables to obtain an image of a high resolution. Moreover, by selectively synthesizing color signals of difference shutter cycles, it is possible to enhance the dynamic range. Furthermore, by executing the adaptive interpolation with the R and G pixels from the color filter arrangement, it is possible to improve the resolution not only in the vertical and the horizontal directions but also in the diagonal directions.

It is also possible to provide a neutral density (ND) filter 95 between the half mirror block 83 and the CCD image sensor 84 in the image pickup apparatus 80 and to set an identical shutter speed for the CCD image sensor 84 and the CCD image sensor 86. That is, the CCD image sensor 84 receives a light quantity decreased by the ND filter 95, for generation of the respective color signals, and is capable of generating the respective color signals in the same way as when the shutter speed is increased.

Description will now be directed to an image pickup apparatus according to a fifth embodiment.

In order to eliminate the white-crush as well as the black-crush, the image pickup apparatus according to the fifth embodiment employs, instead of the image combine section 88 of FIG. 17, an image combine section 88a which can switch between a white-crush correction mode and a black-crush correction mode.

Figure 19:
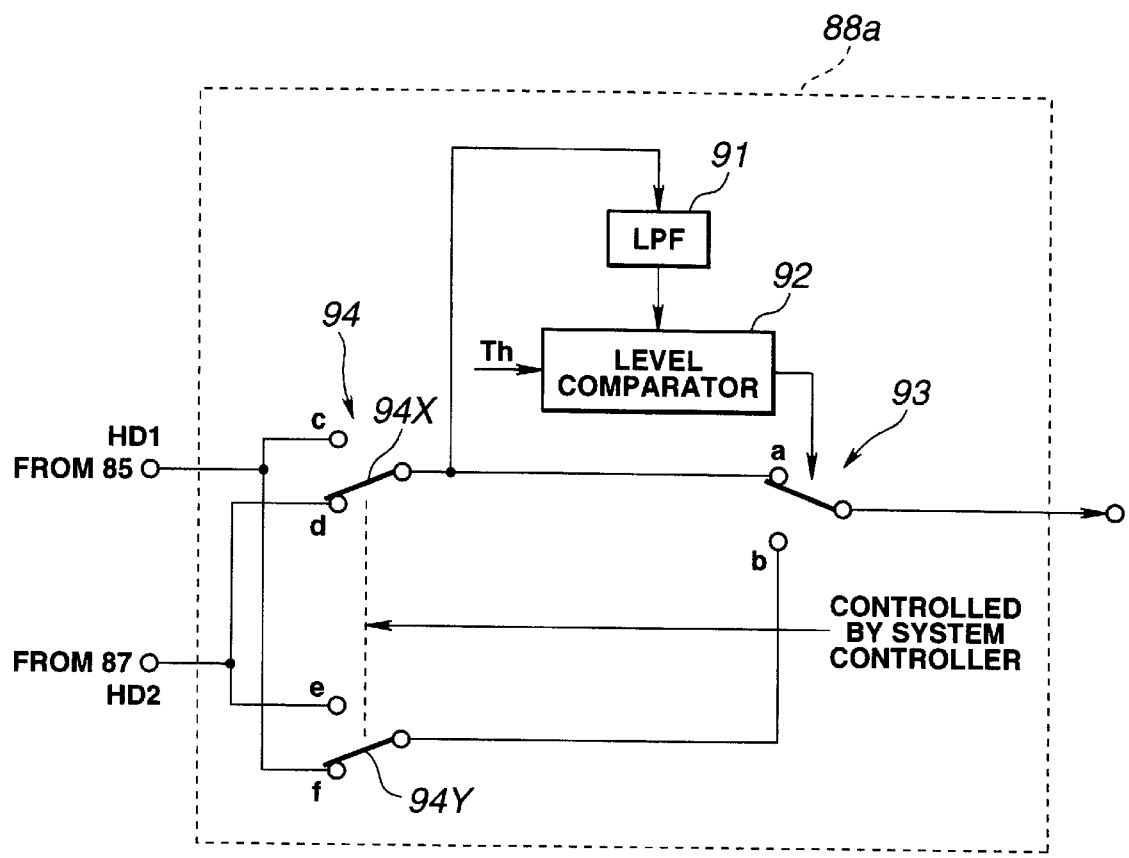
FIG. 19 is a block diagram showing a configuration of another image combine section of the aforementioned image pickup apparatus.

As shown in FIG. 19, the switching circuit 94 in the image combine section 88a includes: a terminals 'c' and 'f' which are supplied with the respective color signals HD1 from the adaptive interpolation section 85; terminals 'd' and 'e' which are supplied with the respective color signals HD2 from the adaptive interpolation section 87; a switch 94X which selectively outputs color signals supplied to the terminal 'c' or 'd'; and a switch 94Y which selectively outputs color signals supplied to the terminal 'e' or 'f'. The switches 94X and 94Y are interlocked with each other and their switching is controlled by the system controller 90. That is, if the white-crush mode is set in, the system controller sets the switch 94X to the terminal 'c', and the switch 94Y to the terminal 'e', and if the black-crush mode is set in, the switch 94X is set to the terminal 'd' and the switch 94Y is set to the terminal 'f'. The switch 94X selectively supplies respective color signals to the LPF 91 and the terminal 'a' of the switching circuit 93, whereas the switch 94Y selectively supplies respective color signals to the terminal 'b' of the switching circuit 93.

Figure 20A:
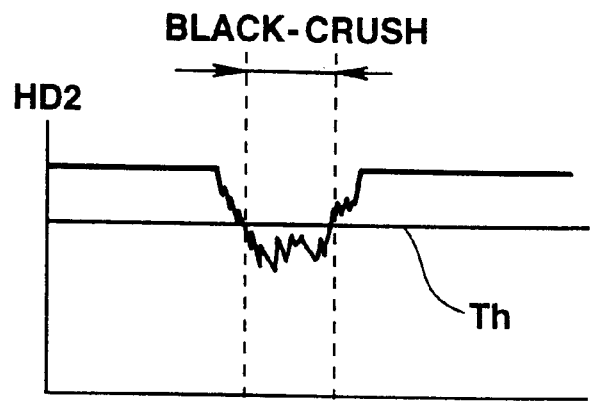
FIG. 20A to FIG. 20D show signal level states of an image data.
Figure 20B:
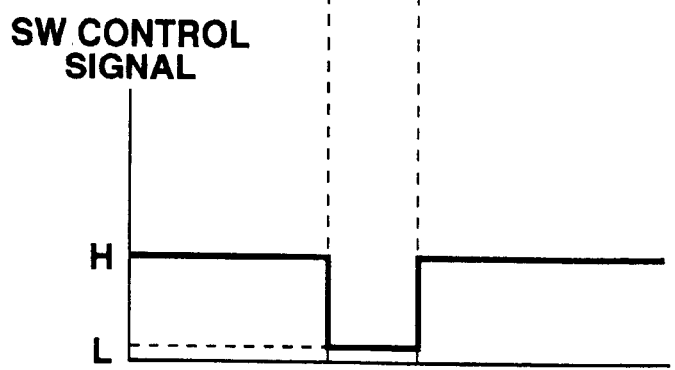

The LPF 91 removes a higher frequency component from the respective color signals and supplies the resultant signals to the level comparator 92. As shown in FIG. 20A, the level comparator 92 compares the levels of the respective color signals supplied from the LPF 91, with a threshold level Th and, as shown in FIG. 20B, outputs a switch control signal if the level of the color signals is higher than the threshold level, Here, the system controller 90 sets the threshold level according to the white-crush correction mode or the black-crush correction mode. The switching circuit 93, upon reception of the switch control signal of H level from the level comparator 92, outputs the color signals which are supplied to the terminal 'a', and upon reception of the switch control signal of L level, outputs the color signals which are supplied to the terminal 'b'.

Figure 20C:
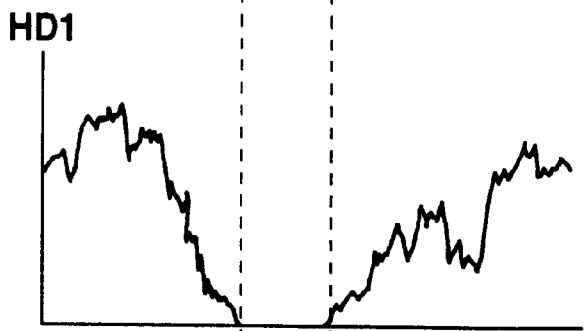

When the black-crush correction mode is set in, the system controller 90 connects the switch 94X to the terminal 'd' and the switch 94Y to the terminal 'f', so as to set the threshold level Th to a predetermined level according to the black-crush correction. In this state, the terminal 'a' of the switching circuit 93 is supplied with the respective color signals HD2 shown in FIG. 20A and the terminal 'b' is supplied with the respective color signals HD1 shown in FIG. 20C.

Figure 20D:
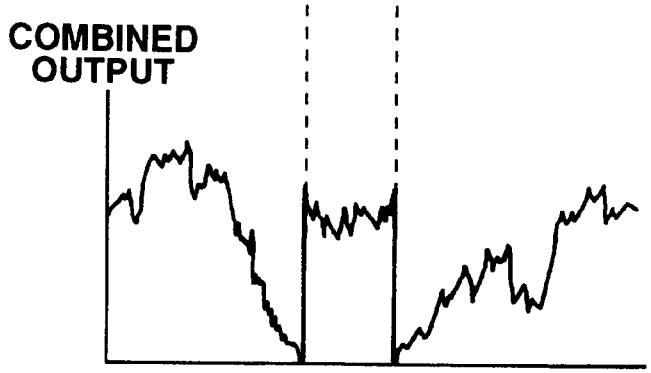

When no black-crush is caused by the color signals HD1, the switch control signal is at H level as shown in FIG. 20 and the switching circuit 93 outputs the color signals HD1 as shown in FIG. 20D. When a black-crush is caused in the color signals HD1, the switch control signal becomes L level and the switching circuit 93 outputs the color signals HD2 as shown in FIG. 20D.

That is, when taking an indoor picture from outdoor for example, and a black-crush is caused in one of the signals HD1 and HD2, the other signal is inserted in the portion where the black-crush is caused, thus enabling to output color signals without black-crush.

It should be noted that when the white-crush correction mode is set in, the image combine section 88a is set as follows: the switch 94X is set to the terminal 'c' and the switch 94Y is set to the terminal 'd'. That is, the image combine section 88a becomes equivalent to the image combine section 88 capable of outputting color signals without white-crush.

Description will now be directed to an image pickup apparatus according to a sixth embodiment.

Figure 21:
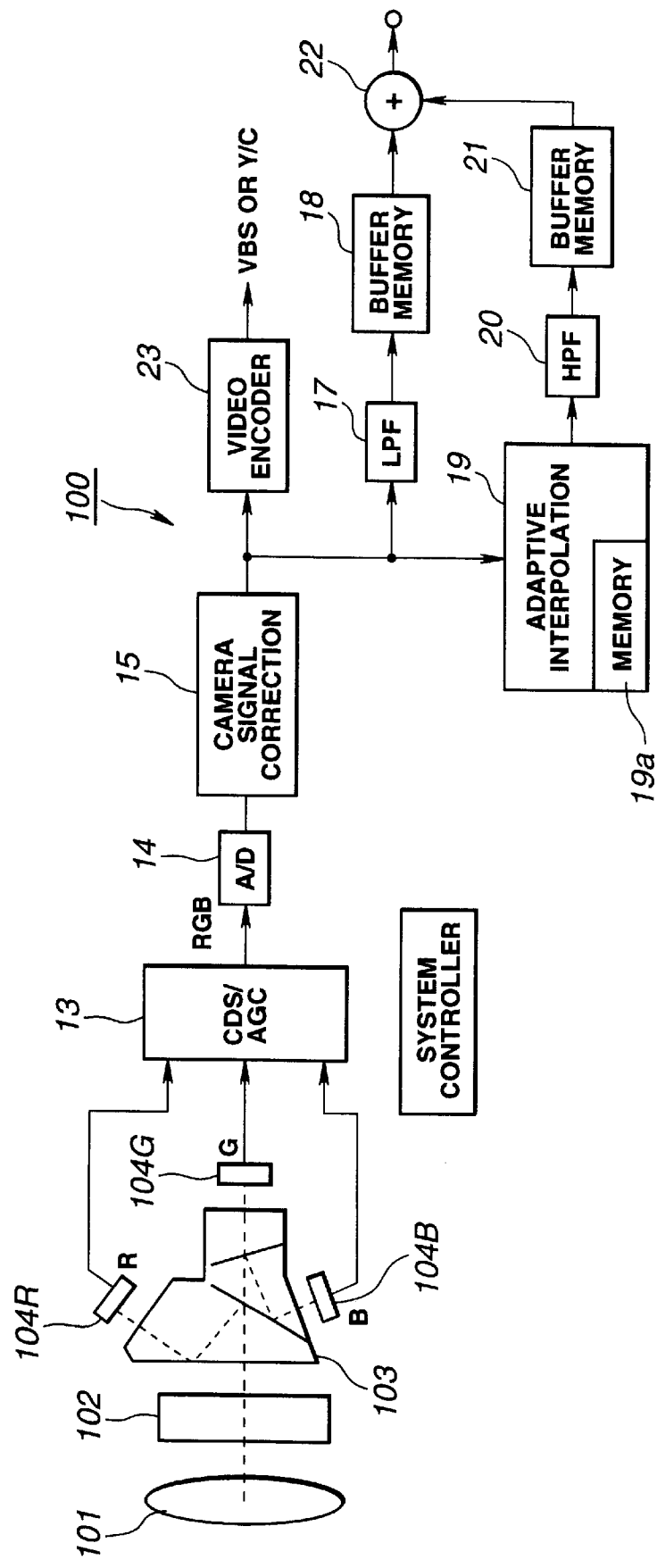
FIG. 21 is a block diagram showing a configuration of an image pickup apparatus according to a sixth embodiment of the present invention.

FIG. 21 is a block diagram showing an example of configuration of the image pickup apparatus according to the sixth embodiment including: a pickup lens 101 for focusing; an optical filter 102 for removing a high frequency component from the picked-up light; a dichroic mirror 103 for splitting the picked-up light into three primary colors Red, Green, and Blue; a CCD image sensor 104R for outputting a color signal R according to the pickup light splitted; a CCD image sensor 104G for outputting a color signal G; and a CCD image sensor 104B for outputting a color signal B.

Here, the CCD image sensors 104R, 104G, and 104B are of the progressing scan type. As shown in FIG. 22, in the CCD image sensors 104R and 104G, G and R are arranged in quincunx with a half-pitch shifting the pixels in the diagonal directions.

The image pickup apparatus 100 further includes: a CDS/AGC circuit 13 for executing a correlated double sampling and gain control to the respective color signals from the CCD image sensors 104R, 104G, and 104B; an A/D convert 14 for digitizing the color signals from the CDS/AGC circuit 13; a DSP 15 for executing a digital signal processing such as γ-correction for the respective color signals from the A/D converter; an LPF 17 for removing a higher frequency component from the color signals from the DSP 15; a buffer memory for storing the color signals from the LPF 17; an adaptive interpolation circuit 19 for executing an adaptive interpolation to the color signals from the DSP 15; an HPF 20 for removing a lower frequency component from the color signals from the adaptive interpolation circuit 19 and generating luminance signals of a higher frequency; a buffer memory 21 for storing the luminance signal of a higher frequency from the HPF 20; and an adder circuit 22 for synthesizing the color signals from the buffer memory 18 and the luminance signal from the buffer memory 21.

In the image pickup apparatus 100 having the aforementioned configuration, the adaptive interpolation circuit 19 is supplied with the respective color signals R, G, and B from the DSP 15. The color signals R and G are stored in the quincunx arrangement shown in FIG. 23A in an internal memory 19a of the adaptive interpolation circuit 19.

The adaptive interpolation circuit 19 sets a pointer at a portion of the quincunx arrangement of the color signals R and G to be interpolated and calculates correlation in the vertical and the horizontal directions so that the adaptive interpolation is executed in the direction of a greater correlation.

Figure 24:
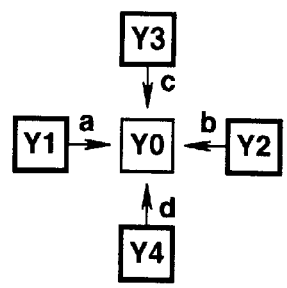
FIG. 24 explains an adaptive interpolation in the adaptive interpolation circuit.

Here, the adaptive interpolation circuit 19 is supplied with the color signals which have been adjusted in white balance adjustment to an identical level of R and G. Consequently, is an attention is paid on the information of the luminance signal Y contained in the pixel data R and G, as shown in FIG. 24, it can be assumed that luminance signals Y1 to Y4 are arranged in the vicinity of an arbitrary pointer Y0. Consequently, the following equation is satisfied.

$$Y0 = aY1 + bY2 + cY3 + dY4$$

Note that the values of a to d are determined by the pixel correlation in the vertical or the horizontal direction.

More specifically, the adaptive interpolation circuit 19 calculates the level difference in the horizontal direction between Y1 and Y2 and the vertical direction between Y3 and Y4 and determines that the direction having a smaller level difference has a greater correlation degree, in which direction the interpolation of Y0 is executed. For example, if the horizontal direction has a greater correlation, the following calculation is carried out.

$$Y0 = (Y1 + Y2)/2$$

As shown in 23B, the luminance signal is interpolated at the shaded positions for the color signals R and G in the quincunx arrangement and the resultant signals are supplied to the HPF 20. The HPF 20 removes a lower frequency component from the color signals R and G and the luminance signal, so as to generate a luminance signal of a high resolution. This luminance signal is supplied via the buffer memory 21 to the adder circuit 22. The adder circuit 22 adds and combines the color signals R, G, and B supplied via the LPF 17 from the DSP 15 and the luminance signal of a higher frequency component so as to generate color signals of a high resolution.

Figure 25A:
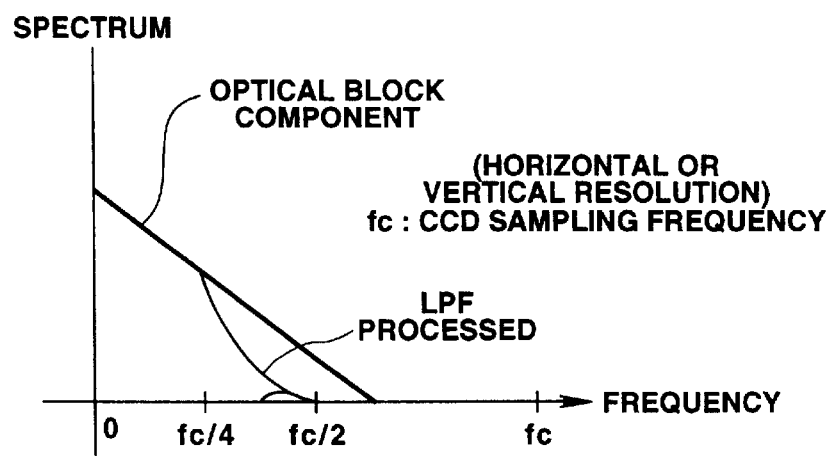
FIG. 25A shows a spectrum characteristic of a conventional image data.
Figure 25B:
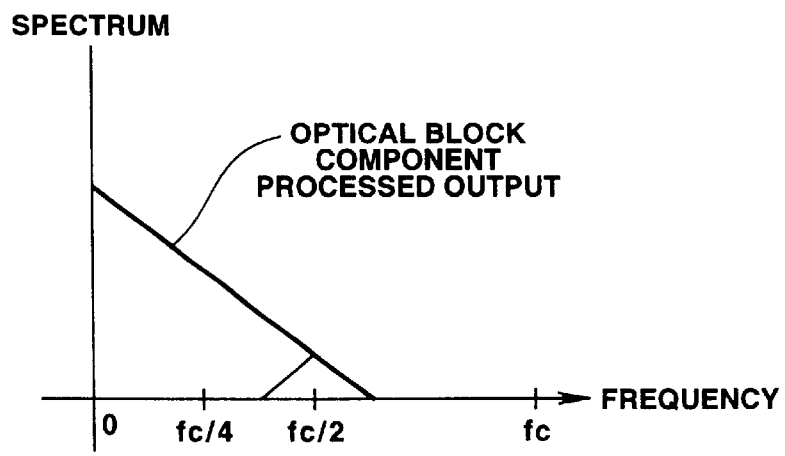
FIG. 25B shows a spectrum characteristic of an image data which has been adaptive-interpolate.

The color signals generated in the adder circuit 22 exhibit no deterioration of a higher frequency zone as shown in FIG. 25B compared to the conventional spectrum characteristic shown in FIG. 25A.

That is, the adaptive interpolation circuit 19 executes an approximate adaptive interpolation so as to generate color signals of preferable image quality.

As has been described above, the image pickup apparatus 100 executes an interpolation in the vertical or the horizontal direction having a greater correlation, so as to generate a luminance signal of a higher frequency component, which is identically added to the respective color signals R, G, and B of intermediate or lower frequency, thus enabling to generate respective color signals of a high resolution and a preferable image quality.

As has thus far been described, according to the present invention, correlation is calculation is carried out for the opposing pixels around the interpolation point and a luminance signal is generated according to the color signals of the two primary colors in the direction having a greater correlation, eliminating a lower frequency component, for synthesizing this luminance signal of a high frequency and a high resolution with the color signals, enabling to generate color signals of the three primary colors of a high resolution.

According to another aspect of the present invention, if a portion to be interpolated in a diagonal direction has a small dispersion degree around it, no interpolation in the diagonal direction is executed but the interpolation is executed in the vertical or horizontal direction having color signals having a high signal level and having the aforementioned greater correlation, thus enabling to obtain an image of a higher resolution.

According to still another aspect of the present invention, interpolation is executed between the respective color signals fetched in a vertical, horizontal, or diagonal direction which has the greatest correlation, thus enabling to improve the resolution of the direction of the lowest direction according to the resolution degrees of the respective directions in each image.

According to yet another aspect of the present invention, it is possible to obtain an image of a high resolution independently of the apparatus type, i.e., single-plate type or multi-plate type.

What is claimed is:

1. An image pickup apparatus comprising:
   an image pickup element having a plurality of pixels arranged in a matrix state, each pixel outputting a sample information according to a light received;
   correlation value detecting means based on sample information from a plurality of pixels positioned in the vicinity of a reference sample position within a frame composed by the sample information outputted from the respective pixels of said image pickup element, for detecting a correlation value of a plurality of sample information in a horizontal direction, a correlation value of a plurality of sample information in a vertical direction, and a correlation value of a plurality of sample information in a diagonal direction; and
   interpolation means based on the sample information of the pixels positioned in the direction having the greatest correlation value detected by said correlation value detecting means, for executing an interpolation for said reference sample position.

2. An image pickup apparatus as claimed in claim 1, wherein said image pickup element further includes first color filters, second color filters, and third color filters provided for each of the pixels, said first color filters being arranged in a checker shape for said plurality of pixels, and outputs a first color sample information from first pixels which correspond to the first color filters, a second color sample information from second pixels which correspond to the second color filters, and a third color sample information from third pixels which correspond to the third color filters.

3. An image pickup apparatus as claimed in claim 2, wherein said first color filters are made from color filters allowing to pass a green component of light; said second color filters are made from color filters allowing to pass a red component of light; and said third color filters are made from color filters allowing to pass a blue component of light, these color filters being arranged in a Green-checkers and Red/Blue line sequential configuration.

4. An image pickup apparatus as claimed in claim 1, wherein said correlation value detecting means detects a correlation value in a first diagonal direction including sample information of pixels positioned at upper right and lower left of said reference sample position and a correlation value in a second diagonal direction including sample information of pixels positioned at upper left and lower right of said reference sample position as the correlation value in a diagonal direction.

5. An image pickup apparatus as claimed in claim 1, said apparatus further comprising high frequency extracting means for extracting a high frequency component from the output from said interpolation means and outputting the obtained component as a high frequency band luminance sample information.

6. An image pickup apparatus as claimed in claim 5, said apparatus further comprising combine means for combining the sample information outputted from said pickup element with said high frequency band luminance sample information.

7. An image pickup apparatus comprising:
   a pickup element having a plurality of pixels arranged in a matrix state and a plurality of first color filters, second color filters, and third color filters, said first filters being arranged in a checker state for said plurality of pixels, wherein
   said pickup element outputs a first color sample information from first pixels which correspond to the first color filters, a second color sample information from second pixels which correspond to the second color filters, and a third sample information from third pixels which correspond to the third color filters, and
   interpolation means for generating a luminance level component equivalent to the positions of said third pixels by way of interpolation according to color sample information outputted from the first and the second pixels positioned in the vicinity of the third pixels.

8. An image pickup apparatus as claimed in claim 7, wherein said interpolation means generates a luminance level component equivalent to positions of said first and said second pixels from the color sample information of the pixels themselves.

9. An image pickup apparatus as claimed in claim 7, said apparatus further comprising high frequency component extracting means for extracting a high frequency component from the output from said interpolation means and outputting the resultant component as a high frequency band luminance sample information.

10. An image pickup apparatus as claimed in claim 9, said apparatus further comprising combine means for combining the first, the second, and the third color sample information outputted from said pickup element with said high frequency band luminance sample information.

11. An image pickup apparatus as claimed in claim 7, wherein said first color filters are made from color filters allowing to pass a green component of light; said second color filters are made from color filters allowing to pass a red component of light; and said third color filters are made from color filters allowing to pass a blue component of light, these color filters being arranged in a Green-checkers and Red/Blue line sequential configuration.

12. An image pickup apparatus as claimed in claim 7, said apparatus further comprising correlation value detecting means based on color sample information from a plurality of pixels positioned in the vicinity of a reference sample possition within a frame composed by the first, second, and third sample information outputted from the respective pixels of said image pickup element, for detecting a correlation value of a plurality of color sample information in a horizontal direction, a correlation value of a plurality of color sample information in a vertical direction, and a correlation value of a plurality of color sample information in a diagonal direction, wherein
said interpolation means executes, based on the color sample information of the pixels positioned in the direction having the greatest correlation value detected by said correlation value detecting means, interpolation for said reference sample position.

13. An image pickup apparatus comprising:
a pickup element having a plurality of pixels arranged in a matrix state and a plurality of first color filters, second color filters, and third color filters, said first filters being arranged in a checker state for said plurality of pixels; wherein said pickup element outputs a first color sample information from first pixels which correspond to the first color filters, a second color sample information from second pixels which correspond to the second color filters, and a third sample information from third pixels which correspond to the third color filters;
correlation value detecting means, based on color sample information from a plurality of pixels positioned in the vicinity of a reference sample position within a frame composed by the first, second, and third sample information outputted from the respective pixels of said image pickup element, for detecting a correlation value of a plurality of color sample information in a horizontal direction, a correlation value of a plurality of color sample information in a vertical direction, and a correlation value of a plurality of color sample information in a diagonal direction;
dispersion degree detecting means for detecting a dispersion degree of color sample information of a plurality of pixels corresponding to the third color filters positioned in the vicinity of said reference sample position; and
interpolation means for executing interpolation for said reference sample position according to the correlation values excluding the correlation value in the direction related to the position of said third color filters when said dispersion degree is below a threshold value.

14. An image pickup apparatus as claimed in claim 13, wherein said pickup element is of a Green-checkers Red/Blue line sequential color filter type consisting of first color filters allowing to pass a green component of light, second color filters allowing to pass a red component of light, and third color filters allowing to pass a blue component of light.

15. A signal processing apparatus for executing an interpolation based on a reference sample position within a frame composed by sample information outputted from a plurality of pixels arranged in a matrix state and provided in an image pickup element which outputs sample information according to a light quantity received by each of the pixels, said interpolation being executed according to sample information of pixels around said reference sample position,
said apparatus comprising:
correlation value detecting means for detecting a correlation value of a plurality of sample information in the vertical direction, a correlation value of a plurality of sample information in the horizontal direction, and a correlation value of a plurality of sample information in the diagonal directions according to sample information of a plurality of pixels position in the vicinity of said reference sample position; and
interpolation means for executing an interpolation for said reference sample position according to sample information of pixels positioned in a direction having the greatest correlation value detected by said correlation value detecting means.

16. A signal processing apparatus as claimed in claim 15, wherein said image pickup element further includes first color filters arrange din a checker state for said plurality of pixels, second color filters, and third color filters, and outputs as said sample information a first color sample information from first pixels which correspond to said first color filters, a second color sample information from second pixels which correspond to said second color filters, and a third color sample information from third pixels which correspond to said third color filters.

17. A signal processing apparatus as claimed in claim 15, wherein said correlation value detecting means detects as the correlation value of sample information in the diagonal directions, a correlation value of a first diagonal direction including sample information of pixels positioned at upper right and lower left of said reference position and a correlation value of a second diagonal direction including sample information of pixels positioned at upper left and lower right of said reference position.

18. A signal processing apparatus as claimed in claim 15, said apparatus further comprising high frequency component extracting means for extracting a high frequency component from the output of said interpolation means and outputting the extracted component as a high luminance sample information.

19. A signal processing apparatus as claimed in claim 18, said apparatus further comprising combine means for combining the sample information outputted from said image pickup element with said high frequency band luminance sample information.

20. A signal processing apparatus as claimed in claim 15, wherein said image pickup element further comprises a color filter of Green-checkers Red/Blue line sequential type consisting of first color filters allowing to pass a green component of light, second color filters allowing to pass a red component of light, and third color filters allowing to pass a blue component of light.

21. A signal processing apparatus for executing an interpolation for an output from an image pickup element having a plurality of pixels arranged in a matrix state and a plurality of first color filters arranged in a checker state corresponding to said plurality of pixels, a plurality of second color filters, and a plurality of third color filters and outputting a first color sample information from first pixels which correspond to said first color filters, a second color sample information from second pixels which correspond to said second color filters, and a third color sample information from third pixels which correspond to said third color filters, wherein said signal processing apparatus comprises:

input means for inputting said first color sample information, said second color sample information, and said third color sample information from said image pickup element;

storage means for temporarily storing said first color sample information, said second color sample information, and said third color sample information supplied from said input means; and interpolation means for generating a luminance component equivalent to positions of said third pixels by way of interpolation according to color sample information outputted from first pixels and second pixels which are positioned in the vicinity of the respective third pixels.

22. A signal processing apparatus as claimed in claim 21, wherein said interpolation means generates a luminance component equivalent to positions of said first pixels and said second pixels from color sample information of these pixels.

23. A signal processing apparatus as claimed in claim 21, said apparatus further comprising high frequency component extracting means for extracting a high frequency component from the output of said interpolation means and outputting the extracted component as a high frequency component luminance sample information.

24. A signal processing apparatus as claimed in claim 23, said apparatus further comprising combine means for combining the first, the second, and the third color sample information outputted from said image pickup element with said high luminance sample information.

25. A signal processing apparatus as claimed in claim 21, said apparatus further comprising correlation value detecting means for detecting a correlation value of a plurality of color sample information in a vertical direction, a correlation value of a plurality of color sample information in a horizontal direction, and a correlation value of a plurality of sample information in diagonal directions, according to color sample information from a plurality of pixels positioned in the vicinity of a reference sample position within a frame composed of the first, the second, and the third sample information outputted from the respective pixels of said image pickup element; wherein said interpolation means executes an interpolation for said reference sample position according to color sample information of pixels positioned in a direction having the greatest correlation value detected by said correlation value detecting means.

26. A signal processing apparatus for executing an interpolation based on color sample information from a plurality of pixels positioned in the vicinity of a reference sample position within a frame composed by first, second, and third color sample information outputted form pixels of an image pickup element having a plurality of pixels arranged in a matrix state and a plurality of first color filters arranged in a checker state corresponding to said plurality of pixels, a plurality of second color filters, and a plurality of third color filters wherein the first color sample information is outputted from first pixels which correspond to said first color filters, the second color sample information is outputted from second pixels which correspond to said second color filters, and the third color sample information is outputted from third pixels which correspond to said third color filters, said apparatus comprising:

correlation value detecting means for detecting a correlation value of a plurality of color sample information in a vertical direction, a correlation value of a plurality of color sample information in a horizontal direction, and a correlation value of a plurality of color sample information in a diagonal direction, according to color sample information of a plurality of pixels positioned in the vicinity of said reference sample position;

dispersion degree detecting means for detecting a dispersion degree of color sample information of a plurality of pixels which correspond to the third color filters positioned in the vicinity of said reference example position; and interpolation means for executing an interpolation for said reference sample position according to the correlation values excluding a correlation value in the direction related to an arrangement of said third color filters when said dispersion degree is below a threshold value.

27. A signal processing apparatus as claimed in claim 26, wherein said image pickup element is a color filter of Green-checkers Red/Blue line sequential type consisting of said first color filters which are color filters allowing to pass a green component of light, said second color filters which are color filters allowing to pass a red component of light, and said third color filters which are color filters allowing to pass a blue component of light.

28. An interpolation method for executing an interpolation according to sample information from a plurality of pixels positioned in the vicinity of a reference sample position within a frame composed by sample information outputted from an image pickup element having a plurality of pixels arranged in a matrix state, each pixel outputting a sample information according a received light quantity, said interpolation method comprising steps of:

detecting for said reference sample position a correlation value of a plurality of sample information in a vertical direction, a correlation value of a plurality of sample information in a horizontal direction, and a correlation value of a plurality of sample information in a diagonal direction, according to sample information from a plurality of pixels positioned in the vicinity of said reference sample position, and executing interpolation for said reference sample position according to a sample information of pixels positioned in a direction having the greatest correlation value detected.

29. An interpolation method for executing an interpolation to an output of an image pickup element having a plurality of pixels arranged in a matrix state and a plurality of first color filters arranged in a checker state corresponding to said plurality of pixels, a plurality of second color filters, and a plurality of third color filters and outputting a first color sample information from first pixels which correspond to said first color filters, a second color sample information from second pixels which correspond to said second color filters, and a third color sample information from third pixels which correspond to said third color filters, said method comprising steps of:

inputting said first color sample information, said second color sample information, and said third color sample information from said image pickup element;

temporarily storing said first color sample information, said second color sample information, and said third color sample information which have been inputted; and generating by way of interpolation a luminance component equivalent to positions of said third pixels, according to color sample information outputted from the first pixels and the second pixels positioned in the vicinity of the respective third pixels.

30. An interpolation method for executing an interpolation based on color sample information from a plurality of pixels positioned in the vicinity of a reference sample position within a frame composed by first, second, and third color sample information outputted form pixels of an image pickup element having a plurality of pixels arranged in a matrix state and a plurality of first color filters arranged in a checker state corresponding to said plurality of pixels, a plurality of second color filters, and a plurality of third color filters wherein the first color sample information is outputted from first pixels which correspond to said first color filters, the second color sample information is outputted from second pixels which correspond to said second color filters, and the third color sample information is outputted from third pixels which correspond to said third color filters, said method comprising steps of:

detecting a correlation value of a plurality of color sample information in a vertical direction, a correlation value of a plurality of color sample information in a horizontal direction, and a correlation value of a plurality of color sample information in a diagonal direction, according to color sample information of a plurality of pixels positioned in the vicinity of said reference sample position;

detecting a dispersion degree of color sample information of a plurality of pixels which correspond to the third color filters positioned in the vicinity of said reference example position; and executing an interpolation for said reference sample position according to the correlation values excluding a correlation value in the direction related to an arrangement of said third color filters when said dispersion degree is below a threshold value.

* * * * *